US008667556B2

(12) United States Patent
Chang et al.

(10) Patent No.: US 8,667,556 B2
(45) Date of Patent: Mar. 4, 2014

(54) METHOD AND APPARATUS FOR BUILDING AND MANAGING POLICIES

(75) Inventors: David Chang, Milpitas, CA (US);
Prashant Gandhi, San Jose, CA (US);
Abhijit Patra, San Jose, CA (US); Vijay Sagar, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 1437 days.

(21) Appl. No.: 12/123,219

(22) Filed: May 19, 2008

(65) Prior Publication Data
US 2009/0288135 A1 Nov. 19, 2009

(51) Int. Cl.
*H04L 29/06* (2006.01)
(52) U.S. Cl.
USPC ............... 726/1; 709/223; 709/224; 709/225
(58) Field of Classification Search
USPC .............................................. 726/1
See application file for complete search history.

(56) References Cited

U.S. PATENT DOCUMENTS

| 5,706,429 | A  | 1/1998  | Lai et al. |
|---|---|---|---|
| 6,131,120 | A  | 10/2000 | Reid |
| 6,205,480 | B1 | 3/2001  | Broadhurst et al. |
| 6,223,217 | B1 | 4/2001  | Pettus |
| 6,460,141 | B1 | 10/2002 | Olden |
| 6,594,712 | B1 | 7/2003  | Pettey et al. |
| 6,640,238 | B1 | 10/2003 | Bowman-Amuah |
| 6,658,469 | B1 | 12/2003 | Massa et al. |
| 6,675,200 | B1 | 1/2004  | Cheriton et al. |
| 6,728,884 | B1 | 4/2004  | Lim |
| 6,754,829 | B1 | 6/2004  | Butt et al. |
| 6,804,720 | B1 | 10/2004 | Vilander et al. |
| 6,889,294 | B1 | 5/2005  | Nichols et al. |
| 6,901,491 | B2 | 5/2005  | Kohn et al. |
| 6,912,604 | B1 | 6/2005  | Tzeng et al. |
| 6,922,724 | B1 | 7/2005  | Freeman et al. |

(Continued)

FOREIGN PATENT DOCUMENTS

| WO | 03104943 A2   | 12/2003 |
|---|---|---|
| WO | 2005081855 A2 | 9/2005  |

(Continued)

OTHER PUBLICATIONS

Gallassi et al., "ATM: Bandwidth Assignment and Bandwidth Enforcement Policies", 1989, pp. 1788-1793.*

(Continued)

*Primary Examiner* — Taghi Arani
*Assistant Examiner* — Thaddeus Plecha

(57) ABSTRACT

Techniques for building and managing network policies for accessing resources of a datacenter are described herein. In one embodiment, events are captured within a network element pertaining to certain activities of accessing certain resources of a datacenter, wherein the network element operates as an application service gateway to the datacenter. A new rule/policy is provisioned based on attributes extracted from the captured events, where the attributes includes at least one of user attribute, environment attribute, and a resource attribute. A simulation is performed on the new rule/policy under a real time network traffic condition, generating a simulation result. The new rule/policy is committed if the simulation result satisfies a predetermined condition, wherein the new rule/policy is enforced within the network element to determine whether a particular client is eligible to access a particular resource of the datacenter. Other methods and apparatuses are also described.

18 Claims, 22 Drawing Sheets

(56) References Cited

U.S. PATENT DOCUMENTS

| | | |
|---|---|---|
| 6,947,984 B2 | 9/2005 | Schweitzer et al. |
| 6,985,956 B2 | 1/2006 | Luke et al. |
| 6,986,040 B1 | 1/2006 | Kramer et al. |
| 6,999,462 B1 | 2/2006 | Acharya |
| 7,010,807 B1 | 3/2006 | Yanovsky |
| 7,051,126 B1 | 5/2006 | Franklin |
| 7,080,378 B1 | 7/2006 | Noland et al. |
| 7,088,727 B1 | 8/2006 | Short et al. |
| 7,100,200 B2 | 8/2006 | Pope et al. |
| 7,114,096 B2 | 9/2006 | Freimuth et al. |
| 7,114,180 B1 | 9/2006 | DeCaprio |
| 7,117,526 B1 | 10/2006 | Short |
| 7,120,792 B1 | 10/2006 | Jacobson et al. |
| 7,146,635 B2 | 12/2006 | Eggebraaten et al. |
| 7,149,808 B2 | 12/2006 | Lu |
| 7,149,817 B2 | 12/2006 | Pettey |
| 7,149,819 B2 | 12/2006 | Pettey |
| 7,149,892 B2 | 12/2006 | Freed et al. |
| 7,171,681 B1 | 1/2007 | Duncan et al. |
| 7,177,277 B2 | 2/2007 | Koponen et al. |
| 7,178,163 B2 | 2/2007 | Reeves, Jr. |
| 7,184,445 B2 | 2/2007 | Gupta et al. |
| 7,185,192 B1 | 2/2007 | Kahn |
| 7,185,361 B1 | 2/2007 | Ashoff et al. |
| 7,185,364 B2 | 2/2007 | Knouse et al. |
| 7,194,554 B1 | 3/2007 | Short et al. |
| 7,197,556 B1 | 3/2007 | Short et al. |
| 7,209,478 B2 | 4/2007 | Rojas et al. |
| 7,209,970 B1 | 4/2007 | Everson et al. |
| 7,209,977 B2 | 4/2007 | Acharya et al. |
| 7,216,152 B2 | 5/2007 | Short et al. |
| 7,216,225 B2 | 5/2007 | Haviv et al. |
| 7,225,364 B2 | 5/2007 | Carnevale et al. |
| 7,228,412 B2 | 6/2007 | Freed et al. |
| 7,308,101 B2 | 12/2007 | Wing |
| 7,350,229 B1 | 3/2008 | Lander |
| 7,584,301 B1 | 9/2009 | Joshi |
| 7,587,492 B2 | 9/2009 | Dyck et al. |
| 7,630,877 B2 | 12/2009 | Brown et al. |
| 7,633,955 B1 | 12/2009 | Saraiya et al. |
| 7,664,110 B1 | 2/2010 | Lovett et al. |
| 7,693,991 B2 | 4/2010 | Greenlee et al. |
| 7,764,678 B2 | 7/2010 | Johnson et al. |
| 2002/0107971 A1 | 8/2002 | Bailey et al. |
| 2002/0129271 A1 | 9/2002 | Stanaway, Jr. et al. |
| 2002/0199006 A1 | 12/2002 | Magnussen et al. |
| 2003/0005073 A1 | 1/2003 | Yoshizawa et al. |
| 2003/0014544 A1 | 1/2003 | Pettey |
| 2003/0043794 A1 | 3/2003 | Cayton et al. |
| 2003/0097454 A1 | 5/2003 | Yamakawa et al. |
| 2003/0097518 A1 | 5/2003 | Kohn et al. |
| 2004/0010545 A1 | 1/2004 | Pandya |
| 2004/0010612 A1 | 1/2004 | Pandya |
| 2004/0030757 A1 | 2/2004 | Pandya |
| 2004/0030770 A1 | 2/2004 | Pandya |
| 2004/0030806 A1 | 2/2004 | Pandya |
| 2004/0037299 A1 | 2/2004 | Pandya |
| 2004/0037319 A1 | 2/2004 | Pandya |
| 2004/0128538 A1 | 7/2004 | Gmuender et al. |
| 2004/0139319 A1 | 7/2004 | Favazza et al. |
| 2004/0165588 A1 | 8/2004 | Pandya |
| 2004/0177099 A1 | 9/2004 | Ganesh et al. |
| 2004/0181690 A1* | 9/2004 | Rothermel et al. ........... 713/201 |
| 2004/0210320 A1 | 10/2004 | Pandya |
| 2004/0213284 A1 | 10/2004 | Clarke et al. |
| 2005/0076166 A1 | 4/2005 | Shearer |
| 2005/0108518 A1 | 5/2005 | Pandya |
| 2005/0147039 A1 | 7/2005 | Biran et al. |
| 2005/0188212 A1 | 8/2005 | Laferriere et al. |
| 2005/0238035 A1 | 10/2005 | Riley |
| 2005/0257244 A1* | 11/2005 | Joly et al. ........................... 726/1 |
| 2005/0257267 A1* | 11/2005 | Williams et al. ................ 726/25 |
| 2005/0286513 A1 | 12/2005 | King |
| 2006/0031506 A1 | 2/2006 | Redgate |
| 2006/0045099 A1 | 3/2006 | Chang et al. |
| 2006/0047771 A1 | 3/2006 | Blackmore et al. |
| 2006/0067346 A1 | 3/2006 | Tucker et al. |
| 2006/0069668 A1 | 3/2006 | Braddy et al. |
| 2006/0070131 A1 | 3/2006 | Braddy et al. |
| 2006/0074837 A1 | 4/2006 | Braddy et al. |
| 2006/0075057 A1 | 4/2006 | Gildea et al. |
| 2006/0075114 A1 | 4/2006 | Panasyuk et al. |
| 2006/0075132 A1 | 4/2006 | Liu |
| 2006/0075463 A1 | 4/2006 | Braddy et al. |
| 2006/0077989 A1 | 4/2006 | Lu et al. |
| 2006/0080667 A1* | 4/2006 | Sanghvi et al. ............... 719/310 |
| 2006/0087989 A1 | 4/2006 | Gai et al. |
| 2006/0095334 A1 | 5/2006 | Simmons |
| 2006/0101225 A1 | 5/2006 | Aloni et al. |
| 2006/0123481 A1 | 6/2006 | Bhatnagar et al. |
| 2006/0136570 A1 | 6/2006 | Pandya |
| 2006/0168274 A1 | 7/2006 | Aloni et al. |
| 2006/0174104 A1 | 8/2006 | Crichton et al. |
| 2006/0200477 A1 | 9/2006 | Barrenechea |
| 2006/0230119 A1 | 10/2006 | Hausauer et al. |
| 2006/0233101 A1 | 10/2006 | Luft et al. |
| 2006/0236063 A1 | 10/2006 | Hausauer et al. |
| 2006/0236385 A1 | 10/2006 | Innes et al. |
| 2006/0259661 A1 | 11/2006 | Feng et al. |
| 2006/0262782 A1 | 11/2006 | Biran et al. |
| 2006/0262796 A1 | 11/2006 | Biran et al. |
| 2006/0262797 A1 | 11/2006 | Biran et al. |
| 2006/0262799 A1 | 11/2006 | Biran et al. |
| 2006/0268866 A1 | 11/2006 | Lok |
| 2006/0277184 A1* | 12/2006 | Faitelson et al. .................. 707/9 |
| 2006/0291803 A1 | 12/2006 | Watson et al. |
| 2007/0002769 A1 | 1/2007 | Matityahu et al. |
| 2007/0005801 A1 | 1/2007 | Kumar et al. |
| 2007/0067638 A1 | 3/2007 | Haibl et al. |
| 2007/0073966 A1 | 3/2007 | Corbin |
| 2007/0121615 A1 | 5/2007 | Weill et al. |
| 2007/0130167 A1 | 6/2007 | Day et al. |
| 2007/0153798 A1 | 7/2007 | Krstulich |
| 2007/0160072 A1 | 7/2007 | Thalanany et al. |
| 2007/0160073 A1 | 7/2007 | Toumura et al. |
| 2007/0165672 A1 | 7/2007 | Keels et al. |
| 2007/0171921 A1 | 7/2007 | Wookey et al. |
| 2007/0174429 A1 | 7/2007 | Mazzaferri et al. |
| 2007/0179955 A1 | 8/2007 | Croft et al. |
| 2007/0180088 A1 | 8/2007 | Zhao |
| 2007/0180447 A1 | 8/2007 | Mazzaferri et al. |
| 2007/0180493 A1 | 8/2007 | Croft et al. |
| 2007/0226750 A1 | 9/2007 | Sharp et al. |
| 2007/0282917 A1* | 12/2007 | Cohen et al. .................. 709/221 |
| 2009/0185486 A1* | 7/2009 | Gerber et al. .................. 370/234 |
| 2009/0215411 A1* | 8/2009 | Tucker et al. ................. 455/90.2 |

FOREIGN PATENT DOCUMENTS

| | | |
|---|---|---|
| WO | 2005104443 A2 | 11/2005 |
| WO | 2006031496 A2 | 3/2006 |
| WO | 2006113722 A2 | 10/2006 |

OTHER PUBLICATIONS

Amendment filed on Apr. 29, 2011 in co-pending U.S. Appl. No. 12/101,871.

Office Action mailed Jul. 21, 2011 in co-pending U.S. Appl. No. 12/101,871.

Office Action mailed May 12, 2011 in co-pending U.S. Appl. No. 12/212,441.

Amendment filed on Aug. 8, 2011 in co-pending U.S. Appl. No. 12/212,441.

* cited by examiner

Rohati Management System

Hi test  
Refresh | Help | Signout  
Search: Blue

| Policy Management | Device Management | Images | Policy Logs | Event Logs | Alarms | Admin |

:: Events

623 — Analytics | Purge

| Seq | User Id | Resource | User Type | Project Group | Department | Time(GMT-8Hrs) | Response Time (ms) |
|-----|---------|----------|-----------|---------------|------------|----------------|--------------------|
| 1 | Susan | /sharepoint.rohati.com/blue | Contractor | Blue | Marketing | 12:22:07 | 100 |
| 2 | Amar | /sharepoint15.rohati.com/Reports/1Q08 | Employee | Fin-Reports | Finance | 12:22:08 | 175 |
| 3 | Alice | /sharepoint.rohati.com/blue | Employee | Blue | Sales | 12:22:09 | 200 |
| 4 | Alex | /sharepoint7.rohati.com/FallCampaign | Contractor | FallCampaign | Marketing | 12:22:10 | 350 |
| 5 | John | /sharepoint.rohati.com/green | Employee | Green | Engineering | 12:22:11 | 600 |
| 6 | Peter | /sharepoint.rohati.com/red | Employee | Red | Marketing | 12:22:12 | 650 |
| 7 | Jane | /maui-sharepoint.rohati.com/aloha | Contractor | Aloha | Sales | 12:22:13 | 400 |
| 8 | Frank | /sharepointsw.rohati.com/docs/spec.doc | Employee | SW-Docs | Engineering | 12:22:14 | 525 |
| 9 | Cindy | /sharepoint.rohati.com/red | Employee | Red | Marketing | 12:22:15 | 325 |
| 10 | Edward | /sharepointhw.rohati.com/design/ | Employee | HW-Design | Engineering | 12:22:16 | 715 |

608

609 — < Previous | Build Policy | Cancel

Rohati System Inc. Copyright 2007

METHOD AND APPARATUS FOR BUILDING AND MANAGING POLICIES

COPYRIGHT NOTICES

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to network management. More particularly, this invention relates to policy builder and management.

BACKGROUND

Administrators of computer networks generally think of network security in terms of abstract security policies. The administrators design the security policies to protect their organization's information resources against threats that may compromise the confidentiality, integrity, or availability of sensitive data. However, the way that people conceptualize security policies does not match the way that they must implement them using conventional, rule-based security policy models.

A computer network generally includes a number of devices, including switches and routers, connected so as to allow communication among the devices. The devices are often categorized into two classes: end stations such as work stations, desktop PCs, printers, servers, hosts, fax machines, and devices that primarily supply or consume information; and network devices such as switches and routers that primarily forward information between the other devices. In this context, the term "administrators" refers to the people who are in charge of interpreting an organization's security policy as it applies to network usage. They are also responsible for writing and applying the security policy. The term "users" refers to people working in the same organization as the administrators and who depend on the network to perform their jobs.

A network security policy defines rules for allowing or disallowing a specific type of network traffic by a specific user or group of users, or a specific end station or group of end stations, under specific conditions. Its purpose is to protect the organization's information resources based on expectations of proper computer and network use. To adequately protect an organization's information assets, an administrator must develop a comprehensive set of security policies that covers all types of network traffic for each user or object at the organization under each set of operational conditions.

The network devices enforce the security policies. The functions of network devices such as switches and routers include receiving packets of data, and determining whether to forward each packet to another device or location, or to refuse to forward a packet. The particular way that these functions operate is determined, in part, by control instructions stored in the network device. However, there has been a lack of efficient way for an administrator to build and manage policies.

SUMMARY OF THE DESCRIPTION

Techniques for building and managing network policies for accessing resources of a datacenter are described herein. In one embodiment, events are captured within a network element pertaining to certain activities of accessing certain resources of a datacenter, wherein the network element operates as an application service gateway to the datacenter. A new rule/policy is provisioned based on attributes extracted from the captured events, where the attributes includes at least one of user attribute, environment attribute, and a resource attribute. A simulation is performed on the new rule/policy under a real time network traffic condition, generating a simulation result. The new rule/policy is committed if the simulation result satisfies a predetermined condition, wherein the new rule/policy is enforced within the network element to determine whether a particular client is eligible to access a particular resource of the datacenter.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIGS. 6A-6M are screenshots illustrating a graphical user interface (GUI) for building and managing policies according to certain embodiments of the invention.

DETAILED DESCRIPTION

Techniques for building and managing network policies for accessing resources of a datacenter are described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to certain embodiments, an administrator is able to configure to select from a graphical user interface (GUI) for building and managing network policies one or more attributes or events to be logged or discovered. For example, certain user activities of certain users (e.g., employees or contractors) are logged. A log file is generated and transmitted from an application service gateway or appliance to a central management system. The administrator can then select certain attributes (e.g., user attributes or resource attributes, etc.) from the log file to be displayed in the GUI as a template for creating a policy associated with a particular user, project, and/or resource, etc. From the template, one or more rules of one or more policies of one or more policy sets can be built. Thereafter, the rules can be simulated in a real traffic environment or a simulated environment to verify or analyze the rules. If the rules created are not satisfied by the administrator based on an analytical report, the administrator can reevaluate or rebuild the rules with adjustments. The administrator can repeat the above processes until the final rules are committed, in which case, the final rules are pushed to the application service gateway or appliance.

Figure 1:
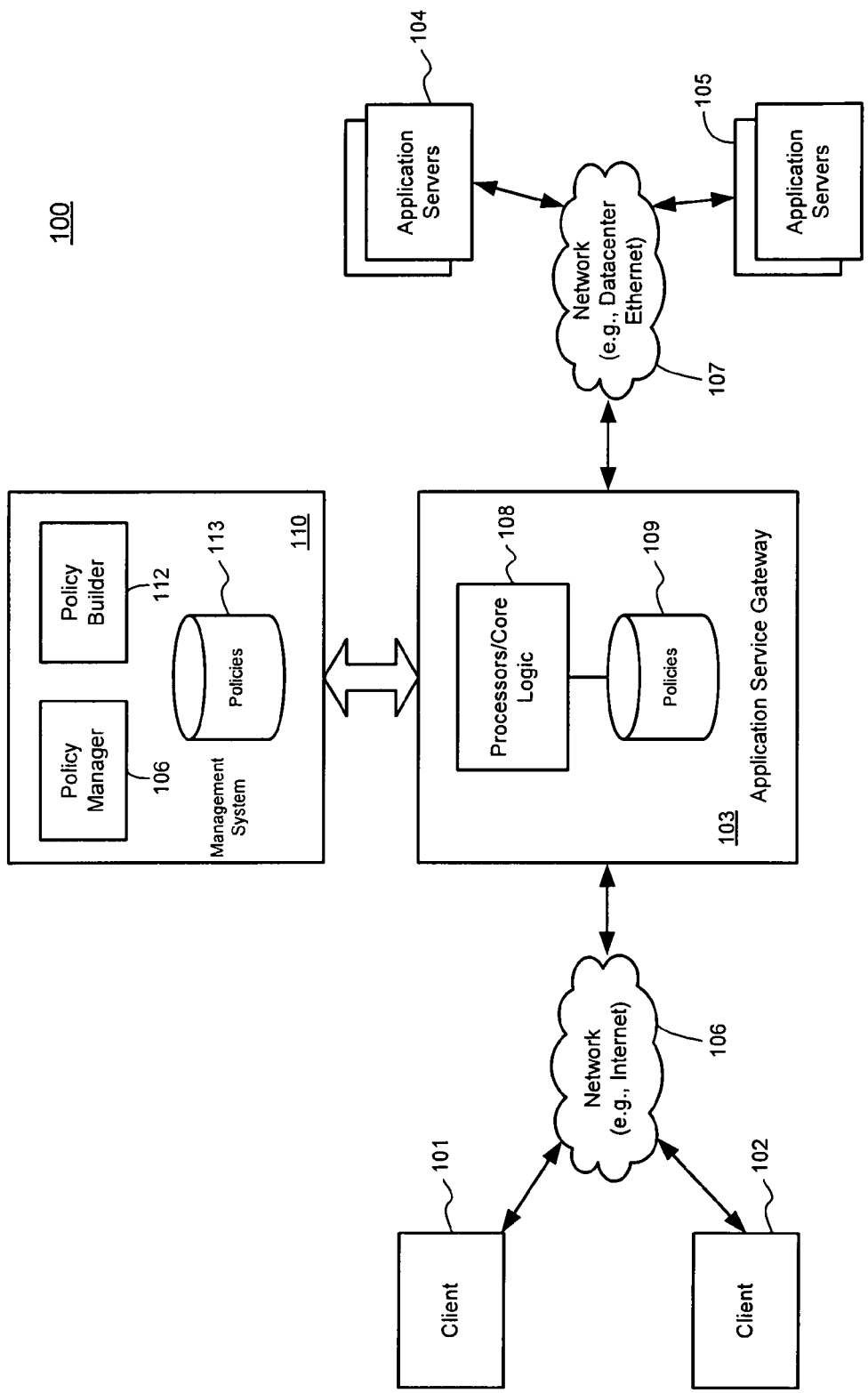
FIG. 1 is a block diagram illustrating an example of a network configuration according to one embodiment of the invention.

FIG. 1 is a block diagram illustrating an example of a network configuration according to one embodiment of the invention. Referring to FIG. 1, network configuration 100 includes one or more clients 101-102 communicatively coupled to an application service gateway or appliance device 103 in order to access one or more application servers 104-105 of a datacenter over networks 106-107. In order to access applications provided by application servers 104-105, each of the clients 101-102 has to go through application service appliance 103 over networks 106-107. Network 106 may be a local area network (LAN) or a wide area network (WAN). Alternatively, network 106 may be an internal network of an entity such as intranet. Network 107 may be a datacenter Ethernet (DCE).

According to one embodiment, device 103 is configured to perform attribute based authentication and/or authorization of clients 101-102 to determine whether a particular client is eligible to access application servers 104-105. Note that system 100 supports both user-to-machine and machine-to-machine authentication/authorization. Digital certificates or machine characteristics (such as serial number, IP address, MAC (media access control) address, host name, etc.) can be used to authenticate a machine. Thus, a client is referred herein as a user, a group of users or machines represented via the above machine characteristics. In one embodiment, device 103 includes multiple processors or core logic 108 which can be used to process network packets in various ways based on one or more policies stored in a policy store 109. Processors/core logic 108 may be configured to process any of layer 2 to layer 7 of OSI (open system interconnect) network layers of processes. For example, one processor/core may be configured to process layer 2 to layer 5 while another processor/core may be configure to process layer 5 to layer 7, etc. In one embodiment processors/core logic 108 may be implemented using an Octeon™ compatible processor available from Cavium Networks of Mountain View, Calif.

Figure 5:
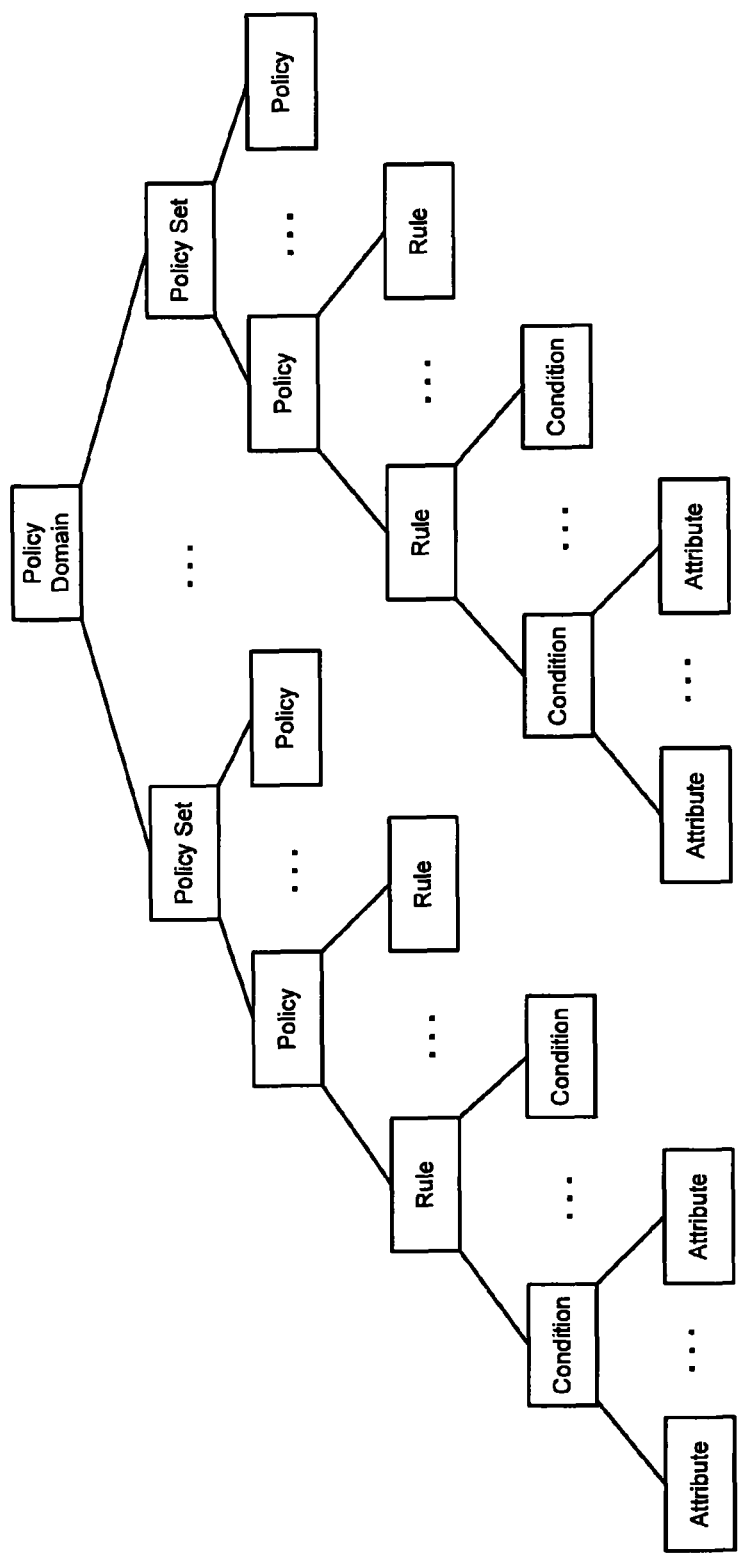
FIG. 5 is a diagram illustrating hierarchical structure of a policy domain according to one embodiment of the invention.

Policy store 109 is configured to store one or more policy domains; each policy domain includes one or more policy sets; each policy set includes one or more policies; and each policy includes one or more rules, as shown in FIG. 5. Policies 109 may be committed from policies 113 of central management system 110 communicatively coupled to application service appliance 103, where the policies 113 are built and maintained by policy manager 111 and policy builder 112.

In one embodiment, an administrator can configure the application service appliance 103 via management system 110 to automatically learn or log certain activities associated with any of clients 101-102 while accessing any of the applications provided by application servers 104-105. As a result, a log file is generated and transmitted back to management system 110 to allow the administrator to build and simulate certain rules which can then be pushed to and enforced by the application service appliance 103. Note that network configuration 100 is shown for illustration purposes only. For example, networks 106-107 may be the same network or different networks. Other configurations may exist.

Figure 2A:
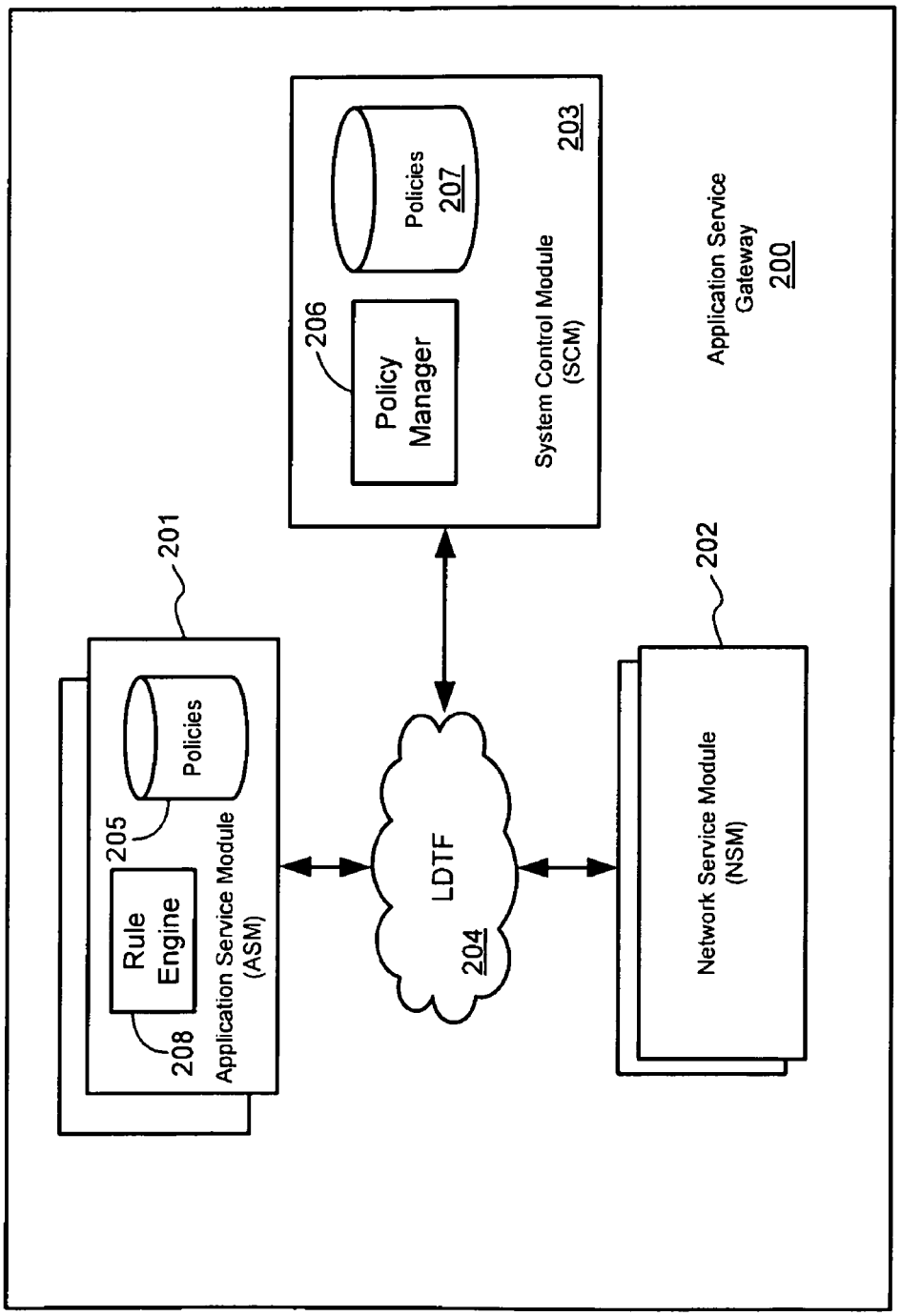
FIGS. 2A-2B are block diagrams illustrating an example of an application service appliance or gateway according to certain embodiments.

FIG. 2A is a block diagram illustrating an example of an application service appliance or gateway according to one embodiment. For example, device 200 may be implemented as part of application service appliance 103 of FIG. 1. Referring to FIG. 2A, application service appliance 200 includes, but is not limited to, one or more application service modules (ASMs) 201 (also referred to as an application service plane) communicatively coupled to one or more network service modules (NSMs) 202 (also referred to as a network service plane) over a lossless switch fabric 204 (also referred to as a lossless data transport fabric or LDTF), which may be an InfiniBand™ compatible switch fabric. In addition, application service appliance 200 includes a system control module (SCM) 203 (also referred to as a management plane) coupled to the LDTF 204 for managing the ASMs 201 and NSMs 202.

According to one embodiment, SCM 203 includes a policy manager 206 to manage policies 207 that have been created and committed by an administrator from a central management system such as system 110 of FIG. 1. Policy manager 206 is configured to configure the policies 207 at configuration time to push the policies 207 to each of the ASMs 201 as runtime policies 205 used by rule engine 208. ASMs 201 are configured to perform layer 4 to layer 7 access control based on the policies 205, including performing triangulated authorization based on various attributes, including user attributes, network attributes, environment attributes, and/or resource attributes, etc.

According to one embodiment, application service appliance 200 is essentially a high-speed full-proxy device and it needs to terminate both client and server ends of a client to server connection. In effect application service appliance 200 acts as a virtual server to actual clients (e.g., clients 101-102 of FIG. 1), and a virtual client to actual servers (e.g., servers 104-105 of FIG. 1). Also, application service appliance 200 is configured to scale in order to be able to process a significant portion of the traffic passing through. This highly-scalable L7 processing bandwidth is a unique differentiator for application service appliance 200, as opposed to existing L4-L7 devices, as they expect the bulk of the traffic processing through the device to be unexamined and unchanged, hence can use a high-speed flow-switching fast path to achieve the target throughput.

According to one embodiment, SCM 203 is responsible for common system management functions as well as configuration and management of processing elements in network and application plane. The SCM 203 includes a low-end processor (also referred to as a management service processor) and has an additional out-of-band connectivity to processing elements on ASMs 201 and NSMs 202. Typically, image download, configuration information, statistic collection messages are exchanged between SCM 203 and rest of the system.

Note that ASMs 201 and NSMs 202 may be implemented as part of multiple processors, where each processor may include multiple cores or alternatively, ASMs 201 and NSMs 202 may be implemented as part of a single processor having multiple cores communicatively coupled to each other via an interconnect or bus, or a shared memory.

Figure 2B:
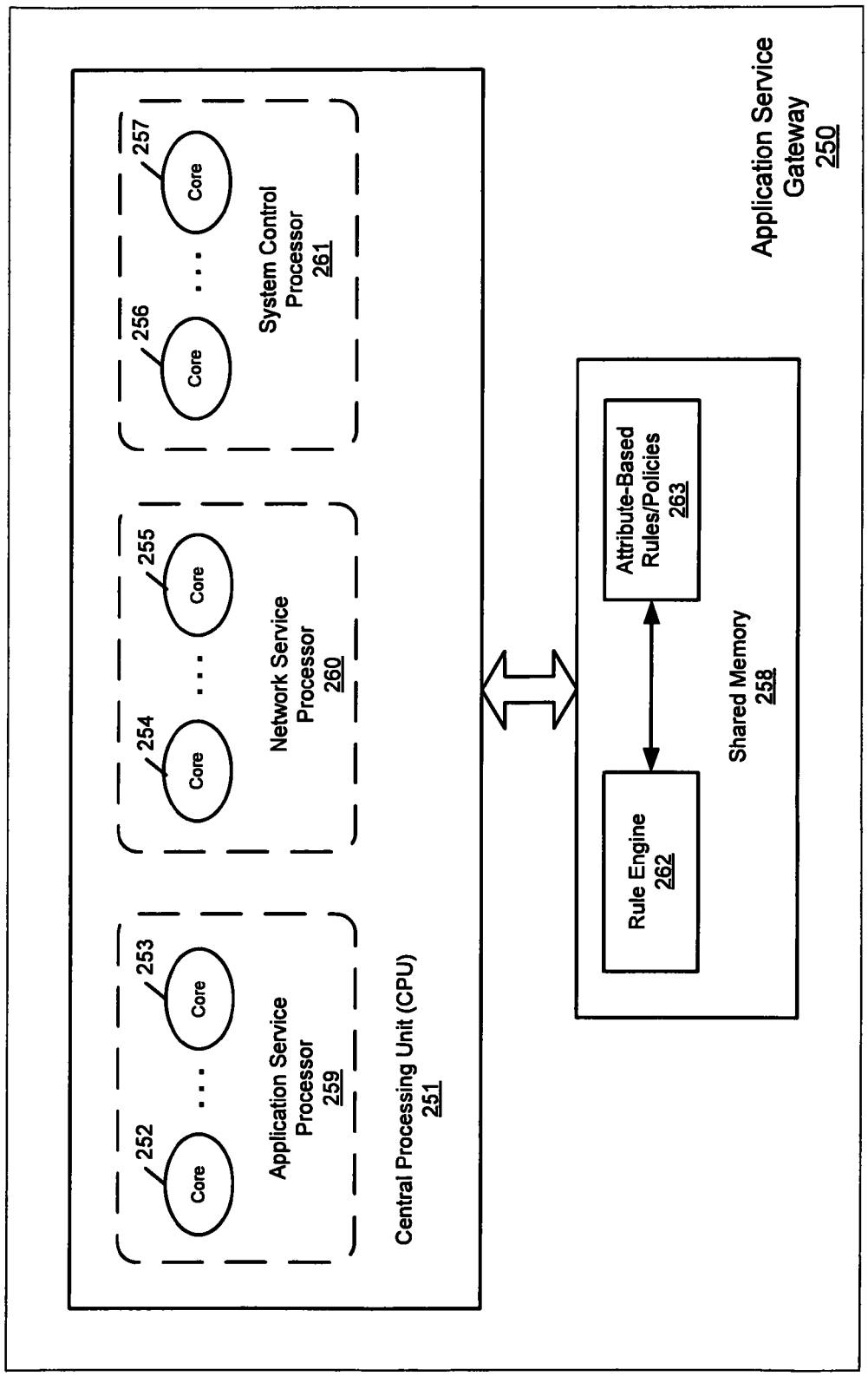

FIG. 2B is a block diagram illustrating an example of an application service appliance or gateway according to an alternative embodiment. Referring to FIG. 2B, in this example, application service gateway or appliance 250 is implemented using a single processor 251 having multiple cores 252-257 (e.g., 16 cores). Certain portions of cores 252-257 may be logically configured or partitioned to be designated as an application service processor (ASP) as part of an ASM, a network service processor (NSP) as part of an NSM, or a system control processor (SCP) as part of an SCM described above.

In this example, as shown in FIG. 2B, cores 252-253 are logically configured as an ASP 259; cores 254-255 are logically configured as an NSP 260; and cores 256-257 are logically configured as an SCP 261. The functionalities of ASP 259, NSP 260, and SCP 261 are similar to those as shown in FIG. 2A. For example, ASP 259 may be configured to handle layer 5 to layer 7 processes while NSP 260 may be configured to handle layer 2 to layer 5 processes. Note that although a single ASP, NSP and SCP are shown; multiple ASPs, NSPs, and SCPs may also be implemented, dependent upon a specification design.

In one embodiment, ASP 259, NSP 260, and SCP 261 communicate with each other via a bus or an interconnect, as well as via shared memory 258. Shared memory 258 may be implemented as an internal memory of CPU 251, an external memory, or a combination of both internal and external memories with respect to CPU 251. Further, rule engine 262 communicatively coupled to attribute-based rule/policy store 263, which may be written using XACML (extensible access control markup language) is loaded and running within shared memory 258 and having functionality similar to components 108-109 of FIG. 1.

Figure 3:
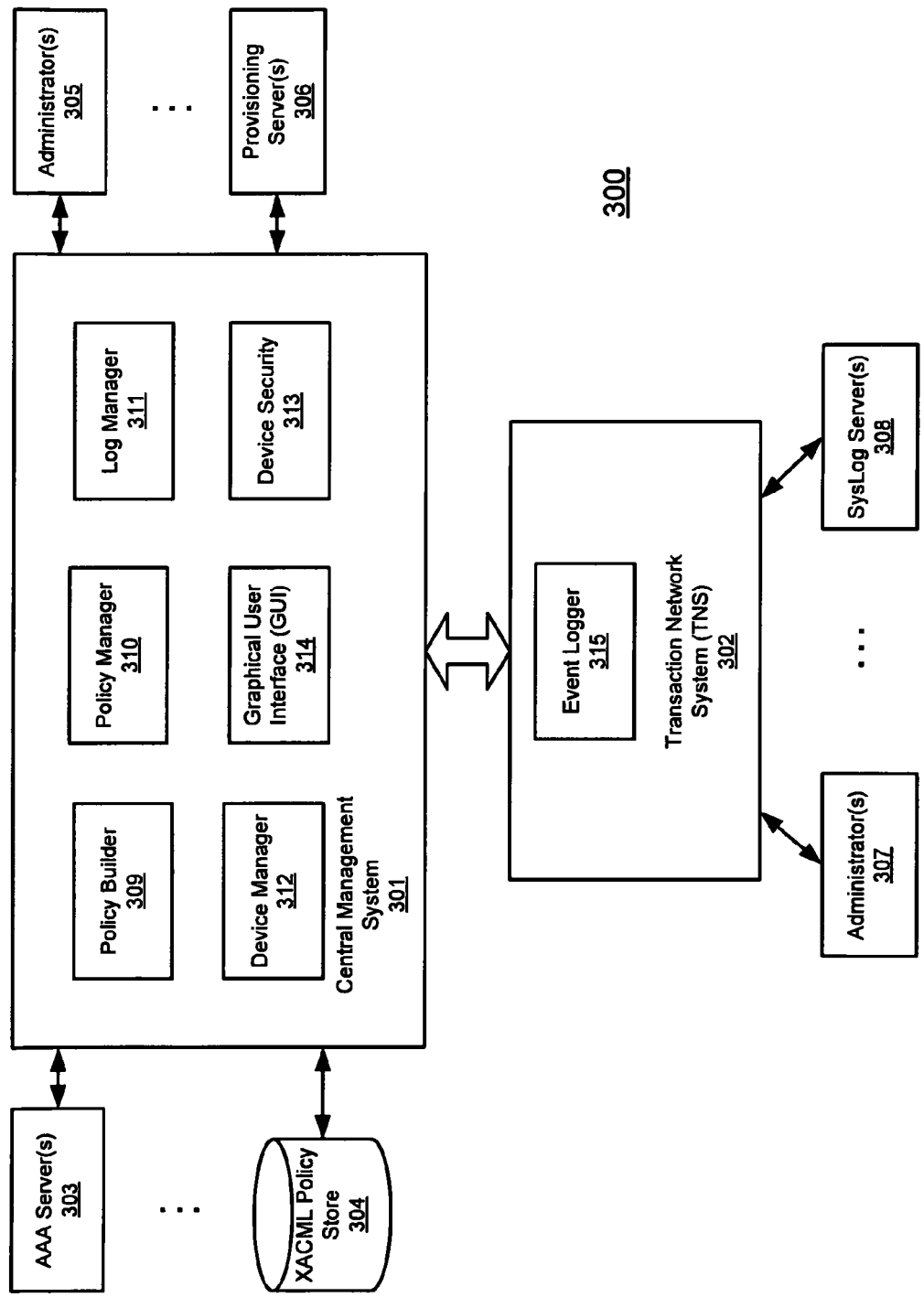
FIG. 3 is a block diagram illustrating an example of a central management system according to one embodiment.

FIG. 3 is a block diagram illustrating an example of a central management system according to one embodiment. Referring to FIG. 3, system 300 includes, but is not limited to, a central management system (CMS) 301 communicatively coupled to a transaction network system (TNS) 302 over a variety of network connections (e.g., HTTPS or SysLog, etc.) Similarly, TNS 302 includes certain interfaces to communicate with other external devices such as administrator 307 over a CLI or console interface or a Syslog server 308. For example, CMS 301 may be implemented as part of management system 110 of FIG. 1 and TNS 302 may be implemented as part of application service gateway or appliance 103 of FIG. 1 or systems 200 and 250 as shown in FIG. 2A-2B.

CMS 301 includes a variety communication interfaces that allow a variety of external devices or servers to communicate with CMS 301. For example, CMS 301 may include a directory interface such as LDAP interface to communicate with XACML policy store 304 and an AAA (authentication, authorization, accounting server) server 303. In addition, an administrator 305 may be able to access CMS for example, via a Web interface or a command line interface (CLI). Other external devices such as provisioning server 306 may also be able to access CMS 301.

According to one embodiment, CMS 301 enables comprehensive configuration and management of TNS 302 through a user-friendly graphical user interface (GUI) application 314. Designed for use in a wide variety of business environment, CMS 301 streamlines critical tasks, such as creating and testing layer-7 access control list (ACL) policies, monitoring one or more TNS devices 302, and analyzing policy-based logs, etc. CMS 301 provides the flexibility and various features that allow organizations of any size to efficiently operate and administer the TNS entitlement control platforms, as part of network based entitlement control (NBEC) solution.

With CMS 301, a user can rapidly create and simulate entitlement control policies based on a variety of attributes, such as, for example, user, resource, environment, and/or protocol attributes with a policy builder 309. CMS 301 can be used to address audit and regulatory compliance requirements quickly and cost-effectively with log manager 311. Log manager 311 enables analysis of events in a business context by capturing and graphing attributes-based transaction logs for all resources and user communities. Policy manager 310 enables an administrator to easily administer policies. Policy manager 310 provides multi-directory bindings to create virtual directories and XACML-based policies. Further, policy creation and management can be delegated to functional owners, which reduces operational costs and ensures alignment of functional and enterprise polices with business requirements.

Referring back to FIG. 3, in one embodiment, policy builder 309 provides a process that simplifies the creation, refinement, and deployment of entitlement control policies. Policy manager 310 provides for administration of XACML-based policies that include user, resource, environment, and/or network attributes. Policy manager 310 is used to configure policy domains, set up directory bindings, and create virtual directory views. Policy manager 310 also can be used to configure and modify policies, or delegate administration on a per virtual context or per policy domain basis.

Log manager 311 provides for management of log data, which may be captured by activity/event logger 315, including collection of event logs, policy logs, and device statistics, graphical analysis of log data, and generation of detailed reports for audit and compliance needs. Device manager 312 provides for centralized management of TNS devices, including network and high-availability configuration, software image management and download, configuration management, reuse, and download, and virtual context configuration for virtualized device operations. Device security unit 313 includes a variety of security capabilities, in which CMS-to-use (via Web browser) and CMS-to-device configuration interactions are performed through the secure HTTPS protocol with digital certificate-based mutual authentication support. Delegation administration provides separate administrator privileges for each virtual context or policy domain, with administrators provisioned in a directory server (e.g., Microsoft Active Directory) or in a local database.

Figure 4A:
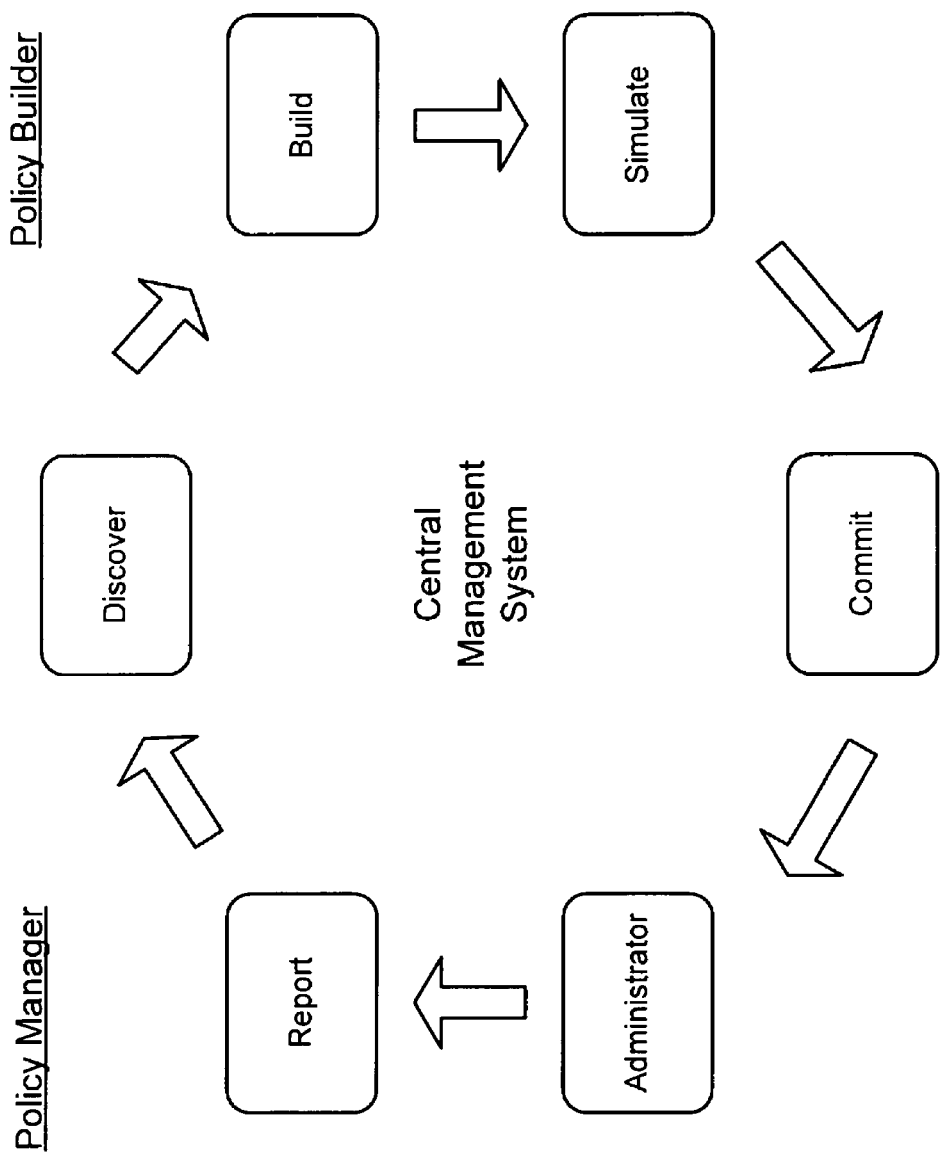
FIG. 4A is a diagram illustrating a life cycle of a policy according to one embodiment of the invention.

FIG. 4A is a diagram illustrating a life cycle of a policy according to one embodiment of the invention. Referring to FIG. 4A, the life cycle of a policy includes a discovery phase, building phase, a simulation phase, a commit phase, an administration phase, and a report phase. During the discovery phase, the application service appliance is configured to operate in a discovery mode and to capture via logging event activities representing users or clients activities in accessing certain resources of certain application servers of a datacenter. During the discovery phase, certain users and resources are automatically detected and learnt by the appliance. The logging can be performed per user basis, per resource basis, or a combination of both. A log file or report is then generated.

Based on the information obtained from the log file generated from the discovery phase, one or more rules of one or more policies can be built during the policy building phase. Such rules or policies can be built based on real time traffic patterns. The newly created rules can then be simulated in production traffic, although such tests would not impact on the production traffic. That is, there may two separate instance of rules/policies, one for enforcement in real traffic and the other one is used for simulation, although these two sets may have similar configurations. The simulation is designed to evaluate the rules in view real production traffic and to validate business assumptions.

If the rules or policies are satisfied by the administrator, the rules or policies can be committed. Otherwise, the administrator can go back to policy building phase for further refine and simulate the modified rules again until they are satisfied in which they can be committed for enforcement. The policies can be changed over time by an administrator and a report may be generated for auditing purposes.

Figure 4B:
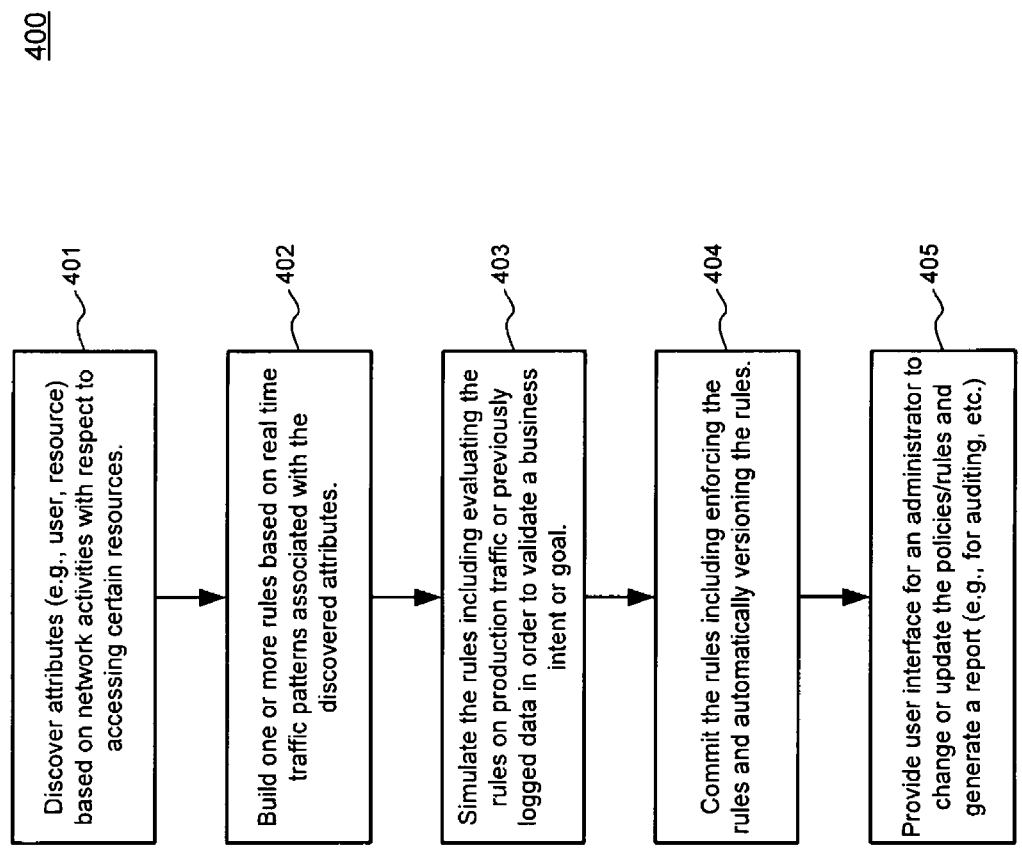
FIG. 4B is a flow diagram illustrating a process for creating and managing policies according to one embodiment.

FIG. 4B is a flow diagram illustrating a process for creating and managing policies according to one embodiment. Note that process 400 may be performed by a processing logic which may include hardware, software, or a combination of both. For example, process 400 may be performed by policy builder 112 and/or policy manager 111 of FIG. 1. Referring to FIG. 4B, at block 401, attributes (e.g., user, network, resource, environment attributes) are discovered based on network activities with respect to accessing certain resources. In one embodiment, the attribute discovery may be performed by logging activities of the network traffic, which may generate a log report. Based on the attributes discovered, at block 402, one or more rules are built based on real time traffic patterns associated with the discovered attributes. For example, certain logged event may be selected and one or more rules are built based on certain attributes of the selected event.

At block 403, the newly created rules are tested or simulated to evaluate the rules under real time traffic condition or previous logged data in order to validate the business intent. At block 404, if the administrator satisfies with the newly created rules, the administrator may commit the rules to be enforced in the application service appliance. On the other hand, if the administrator is not satisfied with the newly created rules, the rules can be further modified and simulated (e.g., blocks 402-403). Note that although a rule is currently committed, a newer version may be modified and simulated concurrently. At block 405, a report based on the enforcement of the rules may be generated for auditing purpose.

As described above, a new policy can be built from scratch (e.g., via a discovery mode). Alternatively, a new policy can be built based on an existing policy with further modification or refinement. Further, a new policy can be built based on certain event or activity logs, such as, for example, global enforcement logs or obligations from enforcement policy set, etc. In one embodiment, a new rule or policy can be created with changes of business logic. For example, a new rule or policy can be created when a scope (e.g., subject, resource, or action) of an existing policy is changed. A policy scope is essentially the "match criteria" for which a policy will apply based upon combination of subject, resource, and action. For example, one could have a scope of one's policy "all CIFS delete actions to my HR files), or a scope could be "all foreign nationals who do not have clearance." Thus, a new policy can be built when a user changes the policy scope of an existing policy; adds a rule to an existing policy; modifies a rule within an existing policy; and creates a new policy within a policy set.

According to certain embodiments, during a discovery mode, there can be no active enforcement or simulated policy sets existed. During a discovery mode, a user can select appropriate log entries; select interest attributes, build a policy based upon interest attributes; and push the policy to simulate policy set (with an option of pushing directly to enforcement with a warning).

Alternatively, as described above, a new policy can be built based on global log or enforcement log (e.g., obligation). From a global log or enforcement log, a user can select a set of log entries. The system then identifies the appropriate policies that triggered the log entries (based on policy ID). The system further identifies other policies that have a similar policy scope that a customer has an ability to create a new policy. Once the existing policy is changed or the new policy is written, a user is given an option of reviewing the policy as well as other policies. A user is then given an option to put the new policy in a simulation policy set for simulation purposes or alternatively, to directly enforce the new policy. Other configurations may also exist.

Figure 6A:
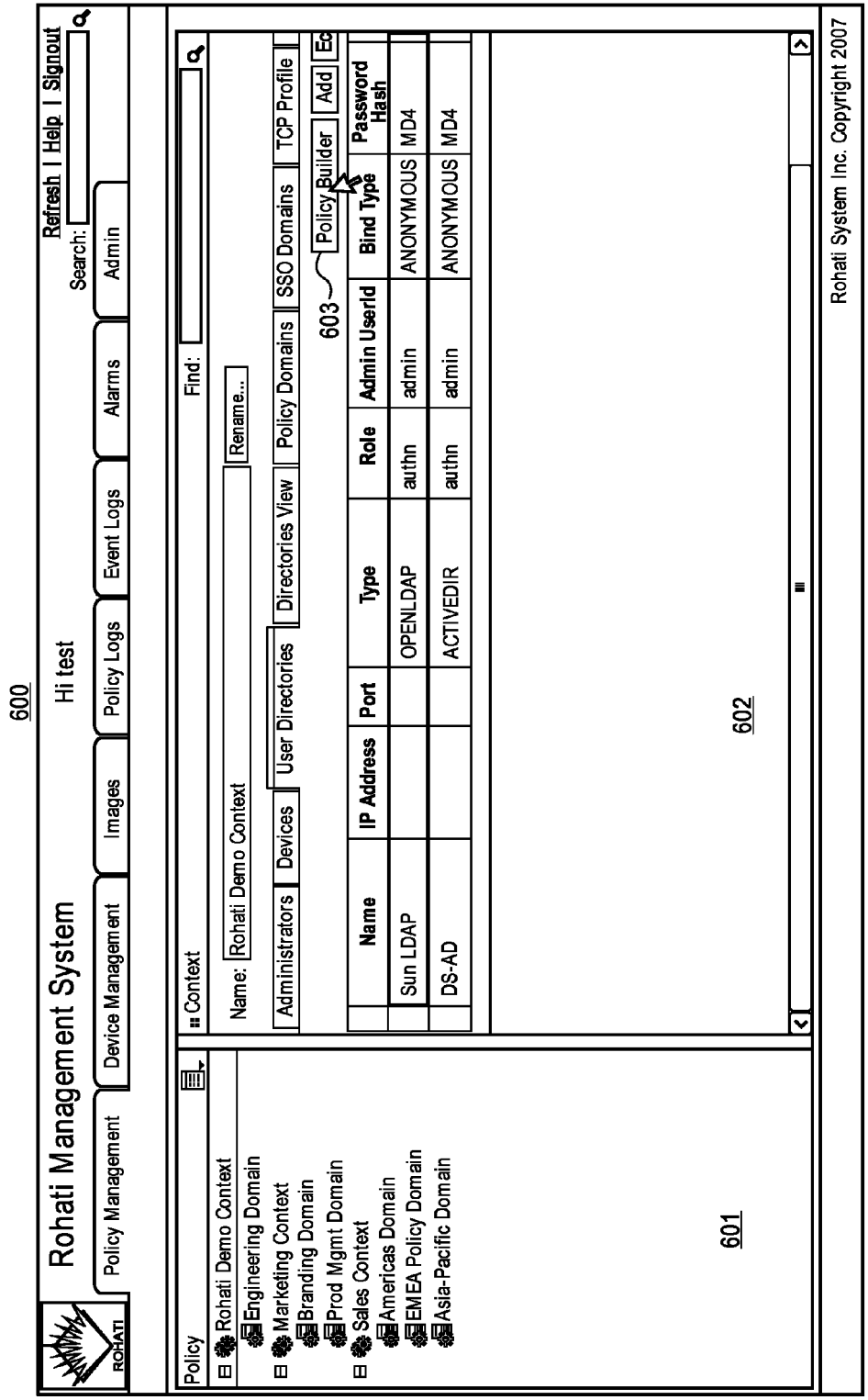

FIGS. 6A-6M are screenshots representing a graphical user interface (GUI) for creating and managing policies according to certain embodiments of the invention. For example, GUI 600 may be implemented as part of policy builder 112 and/or policy manager 111 of a central management system 110 as shown in FIG. 1. Referring to FIG. 6A, according to one embodiment, GUI 600 includes a first window 601 as a policy window to display certain context having one or more policy domains, where each policy domain has a hierarchical structure as shown in FIG. 5. GUI 600 further includes a second window 602 as a content window to display content associated with a context selected from window 601.

In this example, there are multiple tab pages including administrator tab, device tab, user directory tab, etc. In this example, a user directory tab is displayed in window 602, where certain directories are displayed. Such directories may be retrieved from multiple directory servers (e.g., LDAP server), for example, via a virtual directory interface (VDI) that may be built in the application service appliance. When a user directory is selected (e.g., highlighted) and a policy builder button 603 is activated, certain attributes may be captured or logged as shown in FIGS. 6B-6C.

Figure 6B:
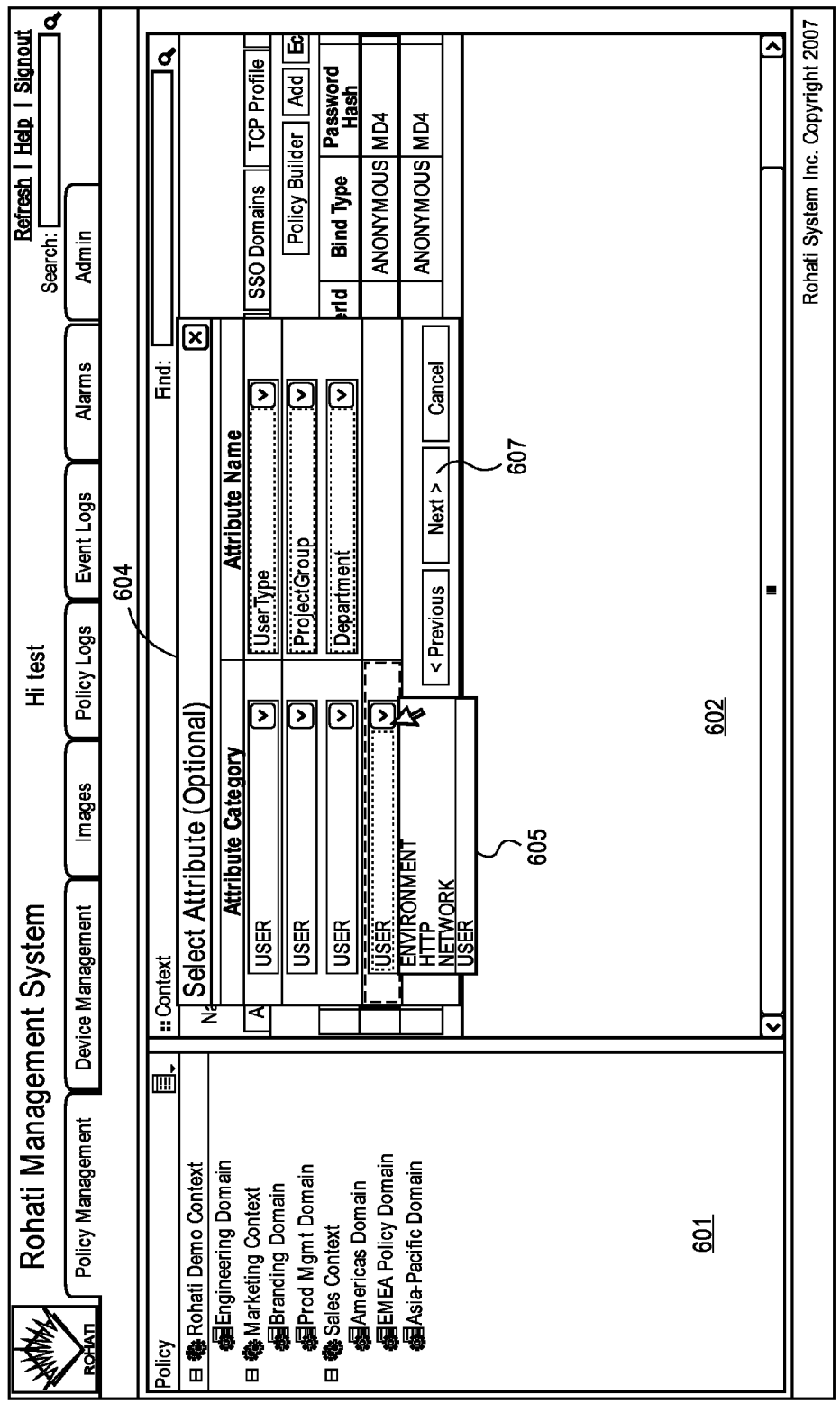
Figure 6C:
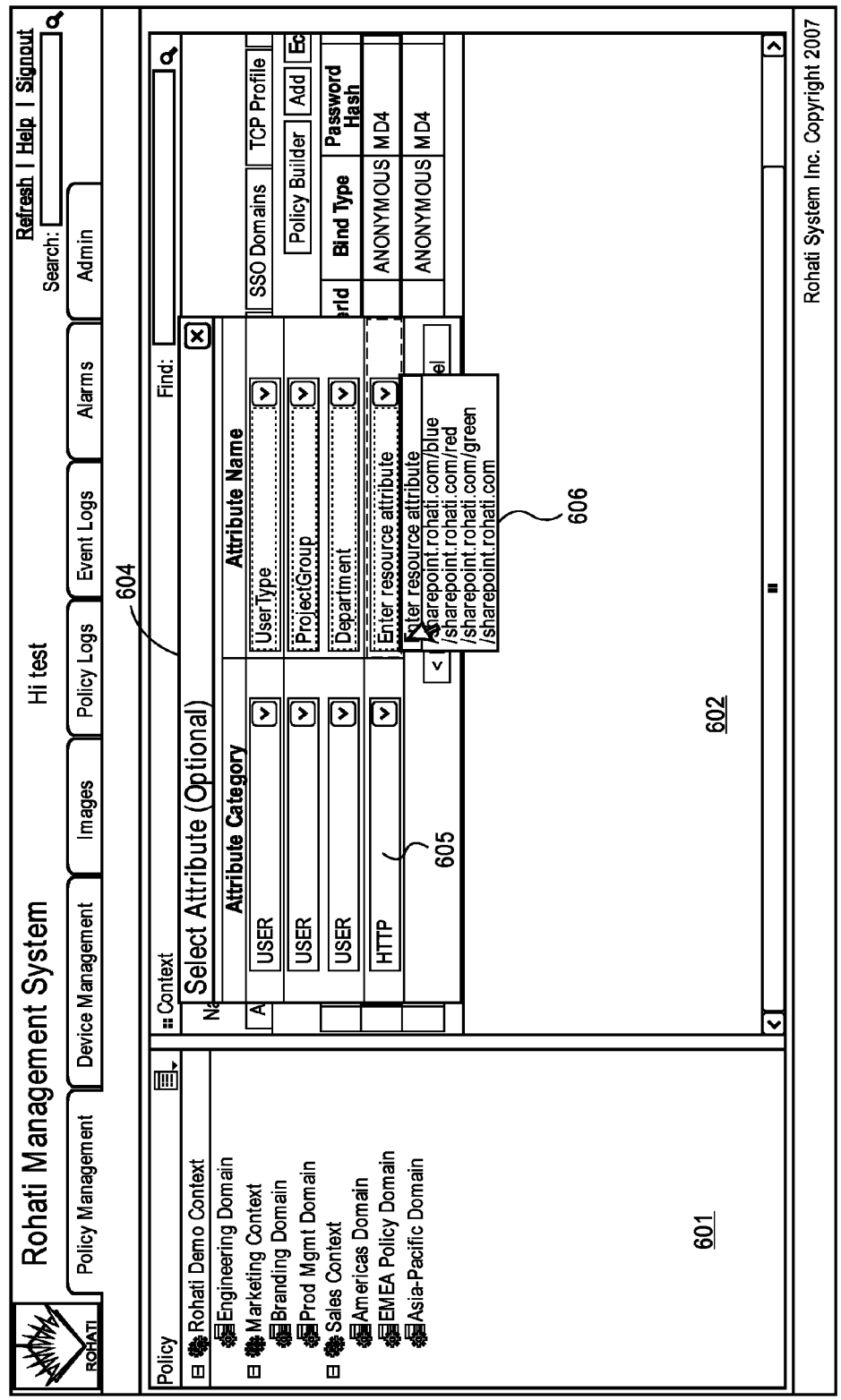

Referring to FIGS. 6B-6C, an optional window 604 is displayed to allow a user (e.g., administrator) to select certain attributes to be captured or logged. An attribute may be selected based on certain attribute categories from a list 605, including user, environment, protocol, network, or other types of attributes. In addition, an attribute may be further selected based on a name of the attribute which can be selected from list 606, including a user type, project group, department, and resource attributes. Note that these categories and names of the attributes are collected or learned from the selected directory server via a variety of directory service protocols and displayed in GUI 600 as a template. As a result, an administrator does not have to remember or type in the specific names.

Once the attributes are selected and a "next" button 607 is activated, events associated with the selected attributes are captured and logged and a log report 608 is generated and displayed as shown in FIG. 6D. Report 608 includes sequences of activities or transactions associated with certain users of the selected user directory above. In this example, only the events that include the attributes selected from FIGS. 7B-7C are captured. Basically, the attributes specified in FIGS. 7B-7C are used as a filter to capture certain specific events. Otherwise, all events will be captured, which may be too much information for an administrator to digest.

The report 608 may be generated within the application service appliance 103 of FIG. 1 and transmitted to the management system 110 in which the management software having GUI 600 is running. Referring back to FIG. 6D, any of the sequences of any user may be searched and selected for building a policy for the selected user or users by activating a build policy button 609, which ends with the discovery phase and enters a policy building phase.

Figure 6E:
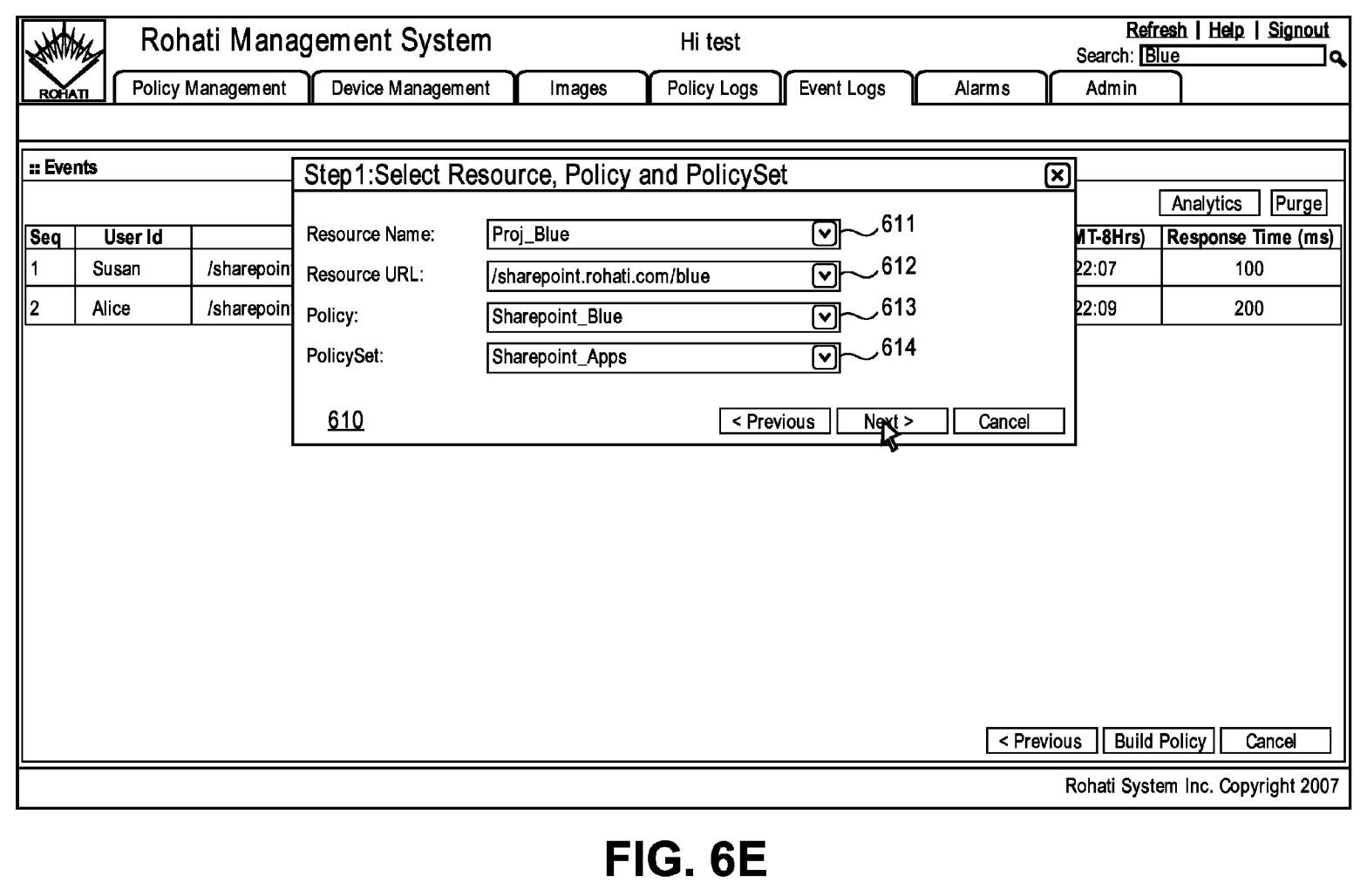

Referring to FIG. 6E, when a user activate button 609 from FIG. 6D after selecting an event having a user ID of "Alice", a user input dialog 610 is displayed to allow a user to specify certain parameters for a policy to be built. In this example, resource name 611, resource location 612, policy name, 613, and policy set name 614 may be specified. Note that certain information displayed in window 610 may be automatically selected from log report 608 of FIG. 6D and displayed as a default selection. For example, resource URL field 612 may be automatically filled with the corresponding information associated with "Alice" in FIG. 6D (e.g., sequence #3).

Figure 6F:

When a "next" button is activated, another user input dialog 615 is displayed to allow a user to specify (e.g., add or delete) certain attributes in the policy to be built as shown in FIG. 6F. Note that these attributes may be automatically captured or logged during the discovery phase (e.g., attributes associated with "Alice" as shown in FIG. 6D) such that the user does not have to find out itself. In this example, only user attribute of "UserType" having a value of "Employee" remains, while the rest attributes are deleted. Alternatively, one or more attributes may be added by activating an "Add Attributes" button from window 615.

Figure 6G:

From user input dialog 615, when a "next" button is activated, a build rule dialog box 616 is displayed to allow the user to specify certain parameters of the new rule to be built as shown in FIG. 6G. Referring to FIG. 6G, dialog box 616 includes a rule name field 617 to allow the user to specify the name of a rule being built. As shown in FIG. 5, each rule includes one or more attributes and each attribute includes one or more conditions. Dialog box 616 further includes rule attribute field 618 to allow the user to specify a rule represented by attribute type, operator, and a value, as well as effect 619 associated with the rule 620. In this example, the rule represents that if a user is an employee as a condition, the result of the rule would be "permit".

Figure 6H:
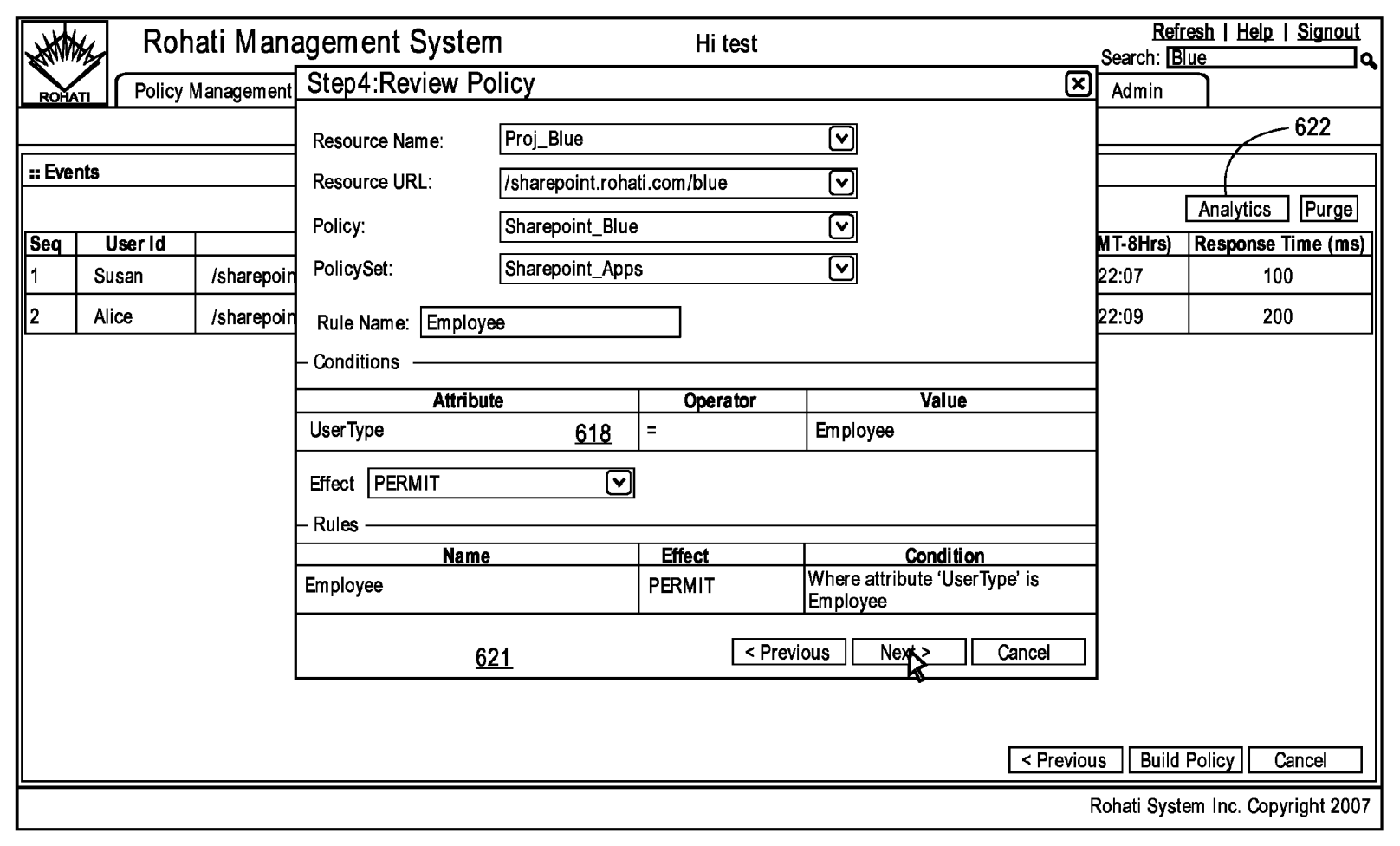
Figure 6I:

Once the rule has been created, the policy associated with the newly created rule can be reviewed as shown in FIG. 6H. Referring to FIG. 6H, an overview of the policy and the rule associated with the policy is displayed in window 621 for review. Note that practically, the information as shown in FIG. 6H includes a combination of information entered in FIGS. 6E and 6G. Upon clicking a "next" button from FIG. 6H, a summary of a policy having the newly created rule is displayed as shown in FIG. 6I. In this example, there are two rules in policy "Sharepoint_Blue", where an employee can access all resources while a contractor as a member of project "Blue" can only access resources associated with project "Blue".

Figure 6J:
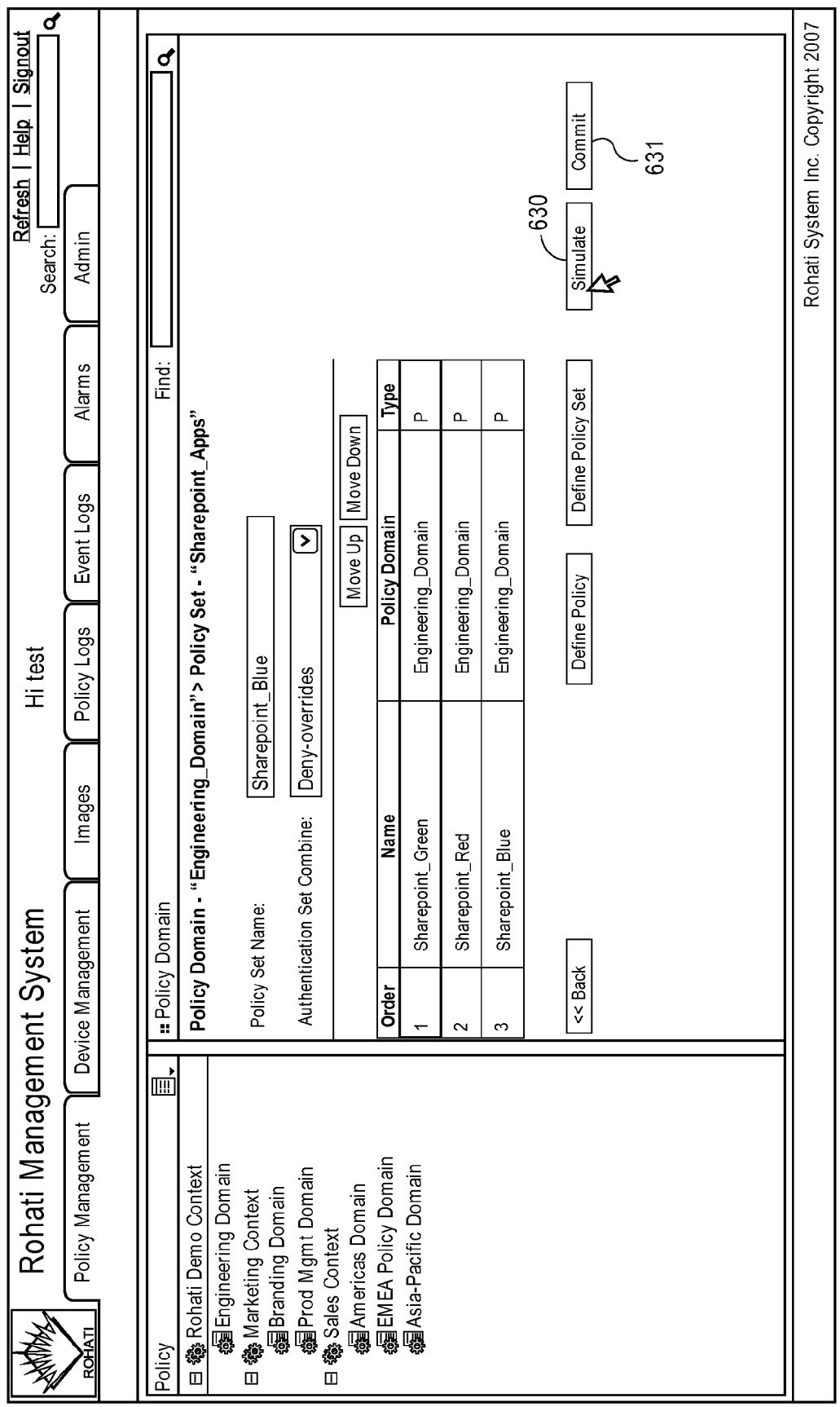

A summary of a policy set having the policy as shown in FIG. 6I is displayed in FIG. 6J. In this example, the policy domain includes a policy set of "Sharepoint_Apps" and the policy set includes three policies: "Sharepoint_Green", "Sharepoint_Red", and "Sharepoint_Blue."

Note that the above rule building process is performed using a top-down approach by selecting certain attributes from a log report of FIG. 6D. According to an alternatively embodiment, a rule or a policy can also be created using a bottom-up approach. Referring back to FIG. 6D, from the log file, a user can perform an analysis on the log report by activating an analytics button 623, which causes an analytics report displayed as shown in FIG. 6K.

Figure 6K:
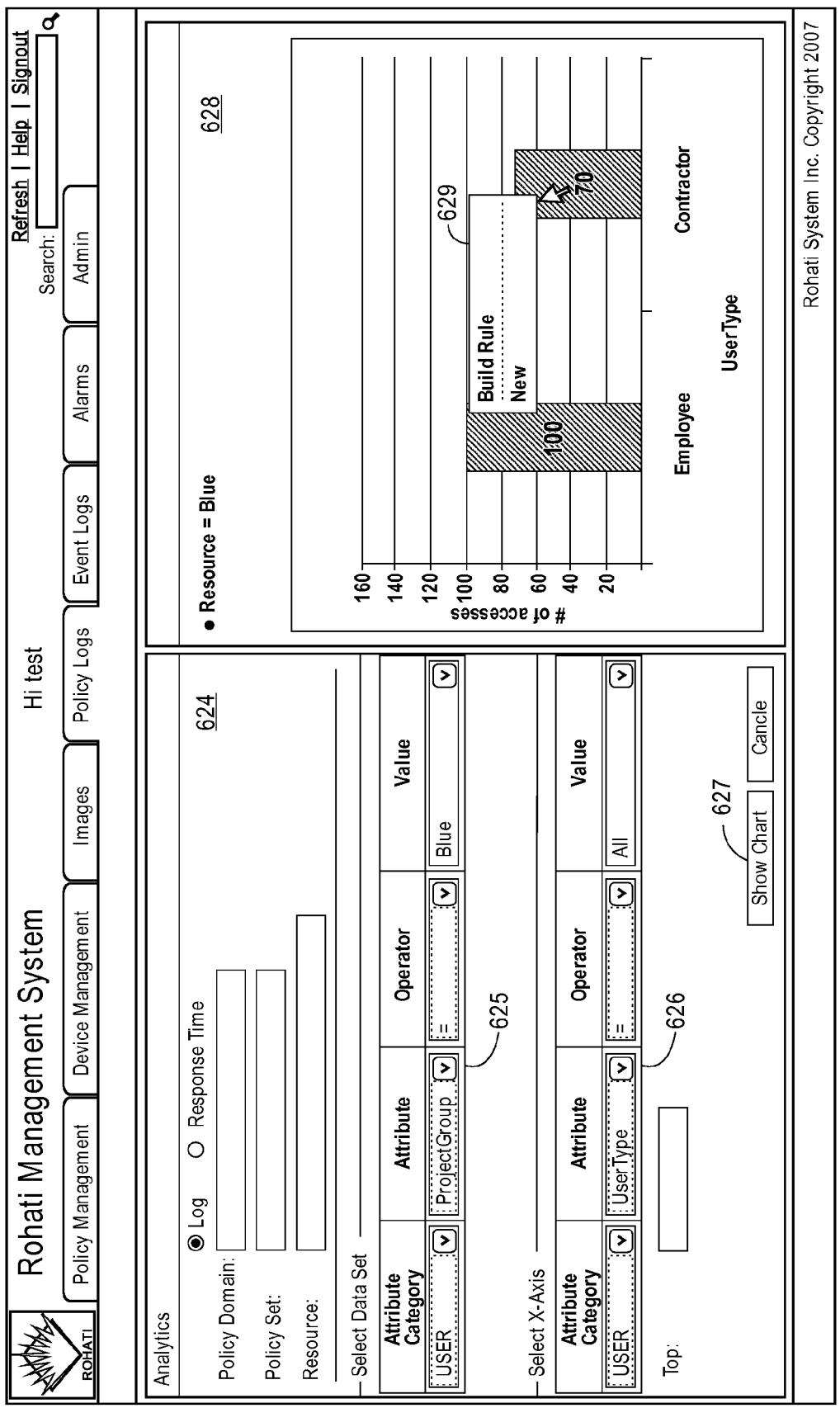

Referring to FIG. 6K, certain attributes can be selected in window 624, including data set 625 and X axis 626. Upon activating button 627, a chart representing statistics of the selected attributes is displayed in window 628 based on settings from fields 625-626. In this example, the chart 628 shows two types of users (e.g., employee and contractors) for accessing a selected resource (e.g., resource "Blue"). From the chart 628, a new rule can be built by selecting a data set (in this example, contractor) which will displays a popup menu 629 from which a new rule can be built using operations similar to those as shown in FIGS. 6H-6J.

Figure 6L:

As described above, once a rule has been created, a user can simulate the newly created rule in a runtime environment. For example, as shown FIG. 6J, a user can simulate the policy set as displayed in FIG. 6J by activating button 630. A result of simulation is then displayed as an event log as shown in FIG. 6L. From the event log of FIG. 6L, a user or administrator can evaluate whether the newly created rules or policies are configured properly. In this example, referring back to FIG. 6I, there are two rules in policy "Sharepoint_Blue", where an employee can access all resources while a contractor as a member of project "Blue" can only access resources associated with project "Blue". The simulation result shown in FIG. 6L indicates that user "Alice" as a member project "Green" attempts to access resources associated with project "Blue" which is a violation of the policy.

Figure 6M:
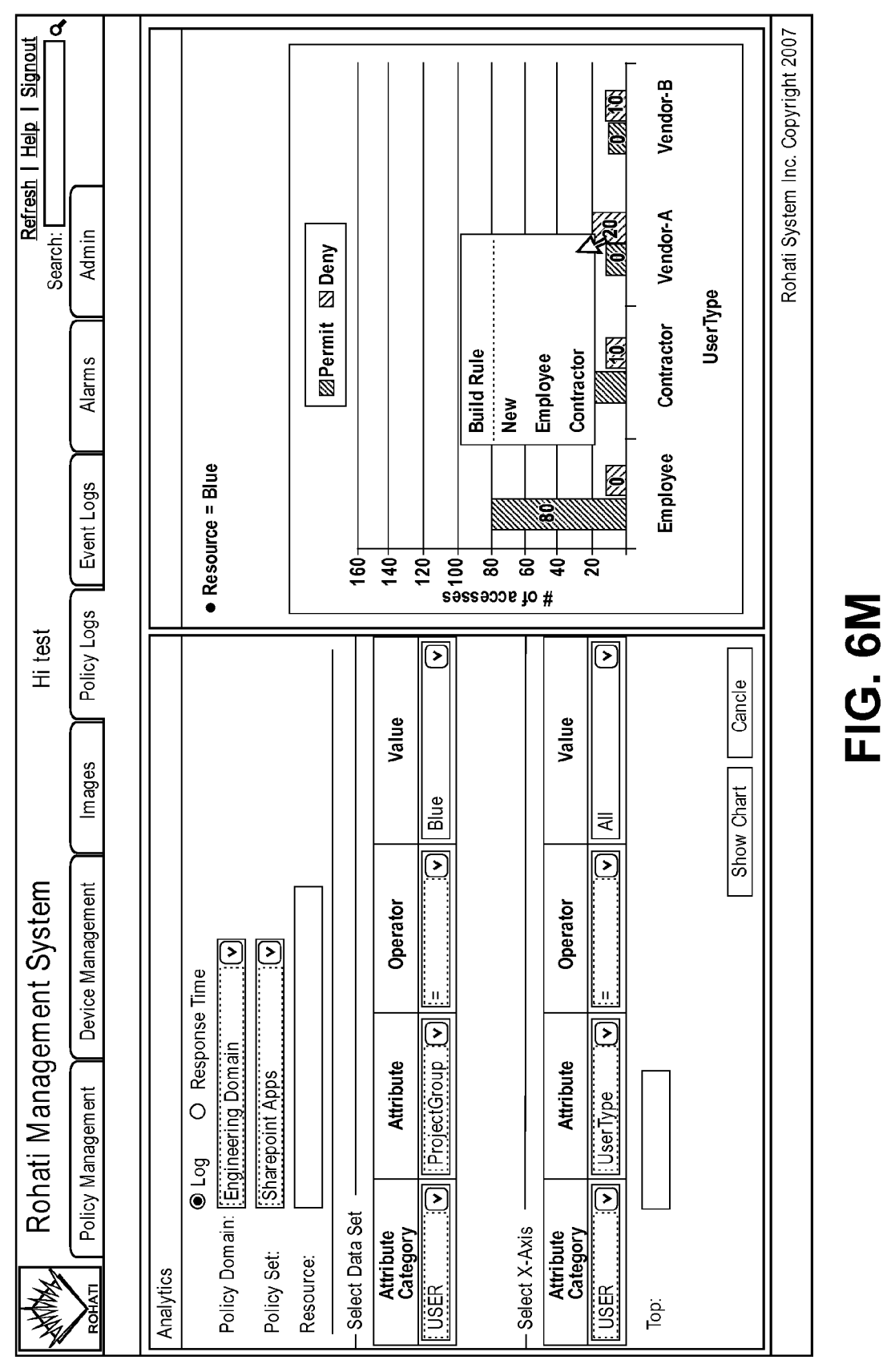

In addition, an analysis can also be performed by activating an analytics button and the analysis result can be displayed as shown in FIG. 6M. Again, further rules can be created by selecting certain data sets in a bottom-up approach described above. Referring back to FIG. 6J, once the rules or policies have been satisfied, a user or administrator can commit the newly created rules or policies by activating a commit button 631, upon which the new rules or policies are pushed down to the application service appliance to be enforced.

Figure 7A:
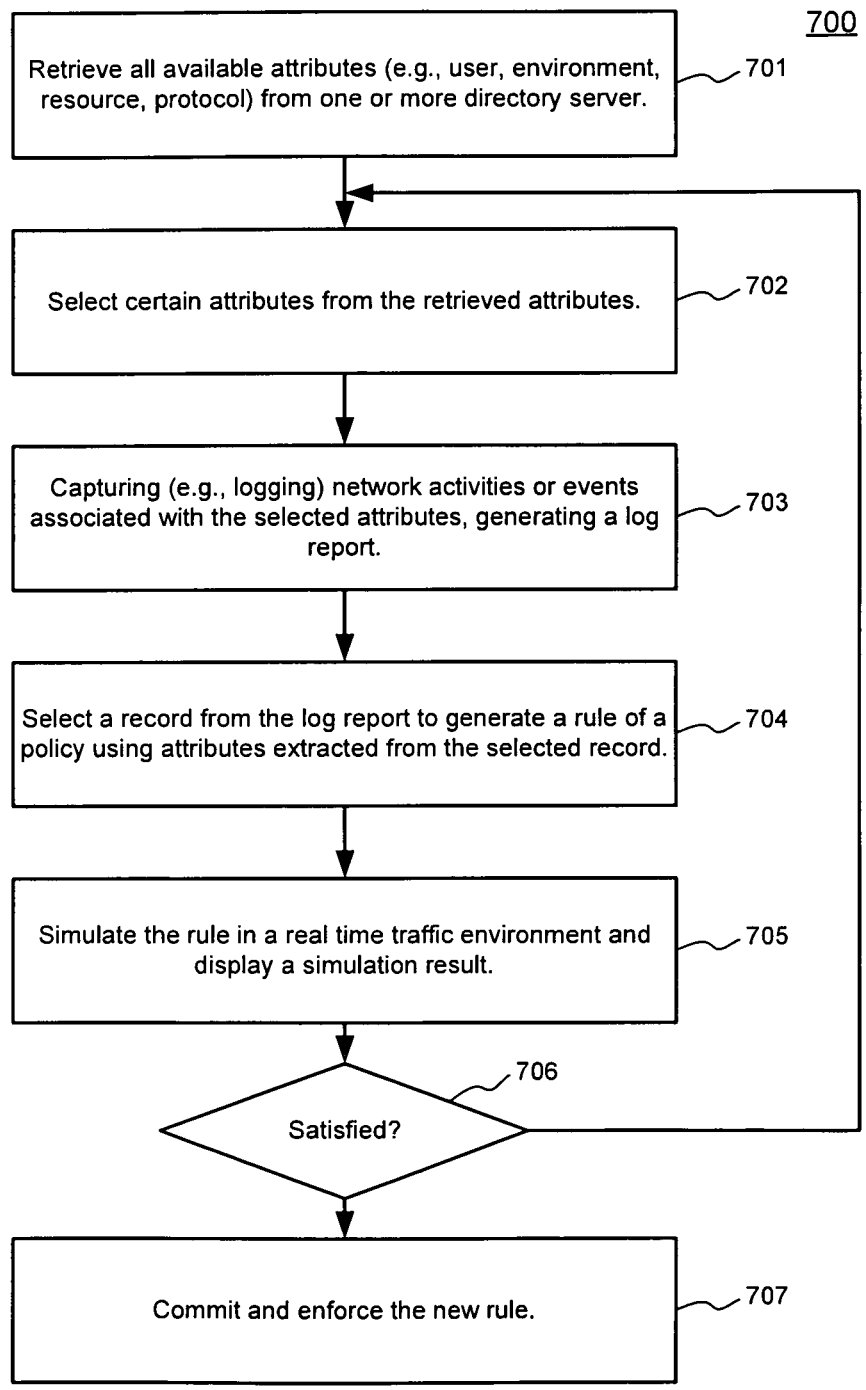
FIGS. 7A-7B are flow diagrams illustrating processes for creating a new rule or policy according to certain embodiments of the invention.
Figure 7B:
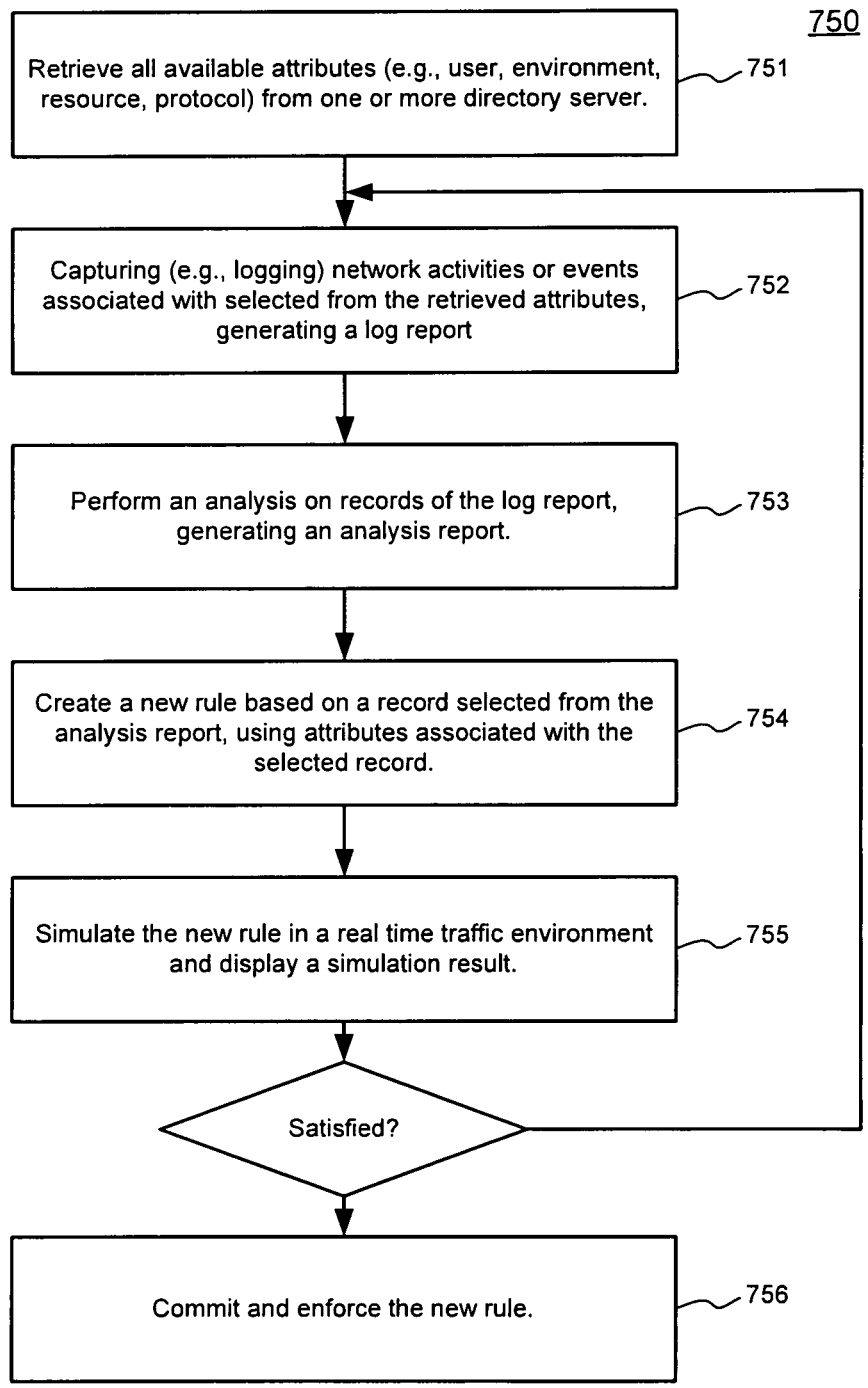

FIG. 7A is a flow diagram illustrating a process for building a rule or policy according to one embodiment of the invention. Note that process 700 may be performed by processing logic which may include software, hardware, or a combination of both. For example, process 700 may be performed by policy manager 111 and/or policy builder 112 of FIG. 1. Process 700 is related to a top-down approach described above.

Referring to FIG. 7A, at block 701, a list of all available attributes is provided from one or more directory servers. At block 702, certain attributes are selected from the list. At block 703, certain events or activities associated with the selected attributes are captured or logged which generates a log report. Based on the log report at block 704, a new rule or policy is created based on attributes associated with a record selected from the log report. At block 705, the newly created rule is simulated or test under a real time traffic environment. At block 706, if the new rule is satisfied with the administrator, at block 707, the new rule is committed and enforced at the application service appliance; otherwise, the certain attributes may be adjusted and the above processes may be repeated to create another new rule until the administrator or certain conditions are satisfied.

FIG. 7B is a flow diagram illustrating a process for building a rule or policy according to one embodiment of the invention. Note that process 750 may be performed by processing logic which may include software, hardware, or a combination of both. For example, process 750 may be performed by policy manager 111 and/or policy builder 112 of FIG. 1. Process 750 is related to a bottom-up approach described above.

Referring to FIG. 7B, at block 751, a list of all available attributes is provided from one or more directory servers. At block 752, certain events or activities associated with the attributes selected from the list are captured or logged which generates a log report. At block 753, an analysis is performed based on captured events or activities, generating an analysis report. At block 754, a new rule or policy is created based on a record selected from the analysis report. Thereafter, similar to process 700, the new rule is simulated at block 755 until it is satisfied upon which the new rule is committed and enforced at block 756.

Thus, techniques for building and managing network policies for accessing resources of a datacenter have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method comprising:
at an application service appliance device, detecting a presence of one or more network users;
logging activities of the network users on at least one of a per user basis and a per resource basis, wherein the activities comprise activities of the network users accessing resources of an application server of a datacenter configured to communicate with the application service appliance device such that the application service appliance device operates as an application service gateway to the datacenter;
generating a log file from the logging for each of the network users;
creating a first policy from the log file for enforcement of real time traffic and a second policy from the log file for simulation of real time traffic to evaluate the first policy of enforcement of the real time traffic without impacting the real time traffic, wherein the first policy and the second policy are based on the real time traffic associated with the network users and attributes extracted from the activities of the network users, the attributes including at least one of a network user attribute, an environment attribute, and a resource attribute;
simulating the real time traffic to evaluate the first policy of enforcement by applying the second policy to the simulated real time traffic;
generating a simulation result from the simulating;
when the simulation result satisfies a predetermined condition, committing the first policy to be enforced in the application services appliance device to determine whether a particular one of the network users is eligible to access a particular resource of the datacenter; and
modifying the first policy when the simulation result does not satisfy the predetermined condition.

2. The method of claim 1, further comprising generating a report from the simulation result, wherein the report comprises event logs, policy logs and device statistics.

3. The method of claim 1, wherein logging the activities comprises:
retrieving a list of predefined attributes available from one or more directory servers;
selecting one or more attributes from the list as a filtering mechanism for logging the activities; and
generating a log report having a plurality of records representing the logging, wherein the records relate to the selected one or more attributes from the list.

4. The method of claim 3, further comprising:
extracting one or more attributes from a record selected from the log report;
generating a first rule template having one or more fields prefilled with the extracted one or more attributes;
modifying the one or more fields of the first rule template in response to an input received from an administrator; and
generating a new rule for the first policy based on information obtained from the first rule template.

5. The method of claim 4, further comprising:
performing an analysis based on the log report;
generating an analysis report based on the analysis of the log report; and provisioning the new rule based on a data set selected from the analysis report.

6. The method of claim 5, wherein provisioning the new rule comprises:
extracting one or more attributes from the data set selected from the analysis report;
generating a second rule template having one or more fields prefilled with the extracted one or more attributes; and
modifying the one or more fields of the second rule template in response to an input received from an administrator.

7. The method of claim 1, further comprising:
performing an analysis based on the generated simulation result;
generating an analysis report based on the performed analysis;
selecting a data set from the analysis report; and
modifying the first policy using attributes extracted from the selected data set of the analysis report.

8. A machine-readable storage device having instructions stored therein, which when executed by a processor, cause the processor to:
detect a presence of one or more network users at an application service appliance device;
log activities of the network users on at least one of a per user basis and a per resource basis, wherein the activities comprise activities of the network users accessing resources of an application server of a datacenter configured to communicate with the application service appliance device such that the application service appliance device operates as an application service gateway to the datacenter;
generate a log file from the log for each of the network users;
create a first policy from the log file for enforcement of real time traffic and a second policy from the log file for simulation of real time traffic to evaluate the first policy of enforcement of the real time traffic without impacting the real time traffic, wherein the first policy and the second policy are based on real time traffic associated with the network users and attributes extracted from the activities of the network users, the attributes including at least one of a network user attribute, an environment attribute, and a resource attribute;
simulate the real time traffic to evaluate the first policy of enforcement by applying the second policy to the simulated real time traffic;
generate a simulation result from the simulated real time traffic;
when the simulation result satisfies a predetermined condition, commit the first policy to be enforced in the application services appliance device to determine whether a particular one of the network users is eligible to access a particular resource of the datacenter; and
modify the first policy when the simulation result does not satisfy the predetermined condition.

9. The machine-readable storage device of claim 8, further comprising instructions that cause the processor to:
generate a report from the simulation result, wherein the report comprises event logs, policy logs and device statistics.

10. The machine-readable storage device of claim 8, wherein the instructions that cause the processor to log activities of the network users comprise instructions that cause the processor to:
retrieve a list of predefined attributes available from one or more directory servers;
select one or more attributes from the list as a filtering mechanism for logging the activities; and
generate a log report having a plurality of records representing the logging, wherein the records relate to the selected one or more attributes from the list.

11. The machine-readable storage device of claim 10, further comprising instructions that cause the processor to:
extract one or more attributes from a record selected from the log report;
generate a first rule template having one or more fields prefilled with the extracted one or more attributes;
modify the one or more fields of the first rule template in response to an input received from an administrator; and
generate a new rule for the first policy based on information obtained from the first rule template.

12. The machine-readable storage device of claim 11, further comprising instructions that cause the processor to:
perform an analysis based on the log report;
generate an analysis report based on the analysis of the log report; and
provision the new rule based on a data set selected from the analysis report.

13. The machine-readable storage device of claim 12, wherein the instructions that cause the processor to provision the new rule comprise instructions that cause the processor to:
extract one or more attributes from the data set of the analysis report;
generate a second rule template having one or more fields prefilled with the extracted one or more attributes; and
modify the one or more fields of the second rule template in response to an input received from an administrator.

14. The machine-readable storage device of claim 8, further comprising instructions that cause the processor to:
perform an analysis based on the generated simulation result;
generate an analysis report based on the performed analysis;
select a data set from the analysis report; and
modify the first policy using attributes extracted from the selected data set of the analysis report.

15. An apparatus comprising:
a memory configured to store a policy database; and
a processor in communication with the policy database and configured to:
detect a presence of one or more network users; and
log activities of the network users on at least one of a per user basis and a per resource basis, wherein the activities comprise activities of the network users accessing resources of an appliance server of a datacenter;
generate a log file from the logging for each of the network users;
create a first policy from the log file for enforcement of real time traffic and a second policy from the log file for simulation of real time traffic to evaluate the first policy of enforcement of the real time traffic without impacting the real time traffic, wherein the first policy and the second policy are based on the real time traffic associated with the network users and attributes extracted from the activities of the network users, the attributes including at least one of a network user attribute, an environment attribute, and a resource attribute;
the real time traffic to evaluate the first policy of enforcement by applying the second policy to the simulated real time traffic;
generate a simulation result from the simulated real time traffic;

when the simulation result satisfies a predetermined condition, commit the first policy to be enforced to determine whether a particular one of the network users is eligible to access a particular resource of the datacenter; and modify the first policy when the simulation result does not satisfy the predetermined condition.

16. The apparatus of claim 15, wherein the processor is further configured to:

extract one or more attributes from a record selected from the log report;

generate a first rule template having one or more fields prefilled with the extracted one or more attributes;

modify the one or more fields of the first rule template in response to an input received from an administrator; and generate a new rule for the first policy based on information obtained from the first rule template.

17. The apparatus of claim 15, wherein the processor is further configured to:

perform an analysis based on the log report;

generate an analysis report based on the analysis of the log report; and provision the new rule based on a data set selected from the analysis report.

18. The apparatus of claim 17, wherein the processor is further configured to:

extract one or more attributes from the selected data set of the analysis report;

generate a second rule template having one or more fields prefilled with the extracted one or more attributes; and modify the one or more fields of the second rule template in response to an input received from an administrator.

* * * * *